United States Patent
Varunjikar et al.

(10) Patent No.: US 10,144,445 B2
(45) Date of Patent: Dec. 4, 2018

(54) MODIFIED STATIC TIRE MODEL FOR PROVIDING ASSIST WITHOUT A TORQUE SENSOR FOR ZERO TO LOW VEHICLE SPEEDS

(71) Applicant: STEERING SOLUTIONS IP HOLDING CORPORATION, Saginaw, MI (US)

(72) Inventors: Tejas M. Varunjikar, Saginaw, MI (US); Anthony J. Champagne, Saginaw, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 0 days.

(21) Appl. No.: 15/181,477

(22) Filed: Jun. 14, 2016

(65) Prior Publication Data

US 2016/0288825 A1 Oct. 6, 2016

Related U.S. Application Data

(63) Continuation-in-part of application No. 14/486,392, filed on Sep. 15, 2014, now Pat. No. 9,409,595.

(51) Int. Cl.
*B62D 6/04* (2006.01)
*B62D 6/08* (2006.01)
(Continued)

(52) U.S. Cl.
CPC .......... *B62D 5/0463* (2013.01); *B62D 5/049* (2013.01); *B62D 5/0484* (2013.01); *B62D 6/006* (2013.01); *B62D 6/08* (2013.01); *B62D 6/00* (2013.01)

(58) Field of Classification Search
CPC .... B62D 5/0463; B62D 5/049; B62D 5/0484; B62D 6/08; B62D 6/006; B62D 6/00
(Continued)

(56) References Cited

U.S. PATENT DOCUMENTS 4,660,671 A * 4/1987 Behr ...................... B62D 5/049
180/404
4,800,974 A * 1/1989 Wand .................. B62D 5/0496
180/446

(Continued)

FOREIGN PATENT DOCUMENTS

CN 1442336 A 9/2003
CN 1651293 A 8/2005
(Continued)

OTHER PUBLICATIONS

Design and construction of a passive mechanism for emulation of load forces in an electric power steering system Luis Daniel Sosa Ruiz et al.; 2017 14th International Conference on Electrical Engineering, Computing Science and Automatic Control (CCE); pp. 1-6; IEEE Conferences; (Year: 2017).*

(Continued)

*Primary Examiner* — Cuong H Nguyen
(74) *Attorney, Agent, or Firm* — Cantor Colburn LLP

(57) ABSTRACT

A method of controlling an electric power steering system is provided. The method estimates steering rack force to be caused by a tire and a surface of a ground with which the tire is in contact in response to determining that one or more hand wheel torque sensors are not enabled. The method generates a steering assist torque command based on the estimated steering rack force. The method controls the electric power steering system using the steering assist torque command.

14 Claims, 12 Drawing Sheets

(51) Int. Cl.
　　*B62D 5/04*　　　　(2006.01)
　　*B62D 6/00*　　　　(2006.01)
(58) Field of Classification Search
　　USPC .... 701/41–43; 180/422, 446, 421, 443–444;
　　　　　　　　　　　　　　　　74/388 PS
　　See application file for complete search history.

(56) References Cited

U.S. PATENT DOCUMENTS

| | | | |
|---|---|---|---|
| 4,874,053 A | 10/1989 | Kimura et al. | |
| 5,029,466 A | 7/1991 | Nishihara et al. | |
| 5,473,539 A | 12/1995 | Shimizu et al. | |
| 5,482,129 A * | 1/1996 | Shimizu | B62D 5/0463 |
| | | | 180/446 |
| 5,709,281 A | 1/1998 | Sherwin et al. | |
| 5,919,241 A | 7/1999 | Bolourchi et al. | |
| 5,927,421 A | 7/1999 | Fukada | |
| 5,948,030 A | 9/1999 | Miller et al. | |
| 5,992,557 A | 11/1999 | Nakamura et al. | |
| 6,032,091 A | 2/2000 | Noro et al. | |
| 6,152,254 A | 11/2000 | Phillips | |
| 6,223,852 B1 | 5/2001 | Mukai et al. | |
| 6,250,419 B1 | 6/2001 | Chabaan et al. | |
| 6,298,941 B1 | 10/2001 | Spadafora | |
| 6,370,459 B1 | 4/2002 | Phillips | |
| 6,425,454 B1 | 7/2002 | Chabaan et al. | |
| 6,588,541 B2 | 7/2003 | Norman et al. | |
| 6,687,590 B2 * | 2/2004 | Kifuku | B62D 5/0463 |
| | | | 180/443 |
| 6,690,137 B2 | 2/2004 | Iwaji et al. | |
| 6,742,620 B2 | 6/2004 | Eidam et al. | |
| 6,799,656 B2 | 10/2004 | Kimura et al. | |
| 6,959,970 B2 | 11/2005 | Tseng | |
| 7,040,450 B2 | 5/2006 | Nagase et al. | |
| 7,558,661 B2 | 7/2009 | Sundaram et al. | |
| 7,596,441 B2 | 9/2009 | Yokota et al. | |
| 7,613,258 B2 | 11/2009 | Yu et al. | |
| 7,885,750 B2 | 2/2011 | Lu | |
| 7,954,593 B2 | 6/2011 | Dornhege et al. | |
| 7,974,754 B2 | 7/2011 | Nakatsu | |
| 7,975,801 B2 | 7/2011 | Tashiro | |
| 8,010,252 B2 | 8/2011 | Getman et al. | |
| 8,108,105 B2 | 1/2012 | Saruwatari et al. | |
| 8,165,770 B2 | 4/2012 | Getman et al. | |
| 8,170,751 B2 | 5/2012 | Lee et al. | |
| 8,175,771 B2 * | 5/2012 | Ukai | B62D 5/046 |
| | | | 180/443 |
| 8,219,283 B2 | 7/2012 | Recker et al. | |
| 8,548,667 B2 | 10/2013 | Kaufmann et al. | |
| 8,571,759 B2 * | 10/2013 | Oblizajek | B62D 5/0472 |
| | | | 180/446 |
| 8,666,605 B2 | 3/2014 | Delarche et al. | |
| 8,666,607 B2 | 3/2014 | Kojo | |
| 8,798,864 B2 | 8/2014 | Champagne et al. | |
| 8,825,301 B2 * | 9/2014 | Sugawara | B62D 5/0463 |
| | | | 180/412 |
| 8,843,276 B2 | 9/2014 | Kojo et al. | |
| 8,903,606 B2 | 12/2014 | Kleinau et al. | |
| 8,977,433 B2 | 3/2015 | Kojima | |
| 8,977,436 B2 * | 3/2015 | Endo | B62D 5/0463 |
| | | | 701/42 |
| 8,977,437 B2 | 3/2015 | Tamaizumi et al. | |
| 9,067,601 B2 | 6/2015 | Itabashi et al. | |
| 9,327,761 B2 * | 5/2016 | Tsubaki | B62D 5/0472 |
| 9,387,875 B2 * | 7/2016 | Shimizu | B62D 5/0463 |
| 9,409,595 B2 * | 8/2016 | Varunjikar | B62D 5/0463 |
| 9,452,775 B2 * | 9/2016 | Tamura | B62D 5/0481 |
| 9,540,040 B2 | 1/2017 | Varunjikar | |
| 9,540,044 B2 | 1/2017 | Kaufmann et al. | |
| 9,545,945 B2 * | 1/2017 | Akatsuka | B62D 5/0463 |
| 9,676,409 B2 | 6/2017 | Champagne et al. | |
| 2002/0005316 A1 | 1/2002 | Tokumoto | |
| 2002/0026267 A1 * | 2/2002 | Kifuku | B62D 5/0466 |
| | | | 701/41 |
| 2002/0092696 A1 | 7/2002 | Bohner et al. | |
| 2002/0177932 A1 * | 11/2002 | Kifuku | B62D 5/0463 |
| | | | 701/41 |
| 2002/0179362 A1 | 12/2002 | Norman et al. | |
| 2003/0030404 A1 | 2/2003 | Iwaji et al. | |
| 2003/0074120 A1 | 4/2003 | Kleinau | |
| 2003/0150366 A1 | 8/2003 | Kaufmann et al. | |
| 2004/0024505 A1 | 2/2004 | Salib et al. | |
| 2004/0055810 A1 | 3/2004 | Rakan | |
| 2004/0099469 A1 * | 5/2004 | Koibuchi | B60T 8/175 |
| | | | 180/421 |
| 2004/0117088 A1 | 6/2004 | Dilger | |
| 2004/0262063 A1 | 12/2004 | Kaufmann et al. | |
| 2005/0189163 A1 | 9/2005 | Barton et al. | |
| 2005/0206224 A1 | 9/2005 | Lu | |
| 2005/0206229 A1 | 9/2005 | Lu et al. | |
| 2005/0246085 A1 | 11/2005 | Salib et al. | |
| 2005/0256620 A1 | 11/2005 | Kato et al. | |
| 2006/0060412 A1 | 3/2006 | Bolourchi et al. | |
| 2006/0069481 A1 | 3/2006 | Kubota et al. | |
| 2007/0299580 A1 | 12/2007 | Lin | |
| 2008/0147276 A1 | 6/2008 | Pattok et al. | |
| 2009/0024281 A1 | 1/2009 | Hwang | |
| 2009/0105907 A1 | 4/2009 | Yamaguchi et al. | |
| 2009/0125186 A1 | 5/2009 | Recker et al. | |
| 2009/0143938 A1 | 6/2009 | Nishimura | |
| 2009/0216407 A1 * | 8/2009 | Cottard | B62D 5/0463 |
| | | | 701/42 |
| 2009/0240389 A1 * | 9/2009 | Nomura | B62D 5/046 |
| | | | 701/31.4 |
| 2009/0271075 A1 | 10/2009 | Hales et al. | |
| 2009/0292421 A1 | 11/2009 | Williams et al. | |
| 2009/0294206 A1 | 12/2009 | Oblizajek et al. | |
| 2010/0100283 A1 | 4/2010 | Hales et al. | |
| 2010/0286869 A1 * | 11/2010 | Katch | B62D 5/0466 |
| | | | 701/41 |
| 2011/0010054 A1 | 1/2011 | Wilson-Jones et al. | |
| 2011/0029972 A1 | 1/2011 | Hung et al. | |
| 2011/0213527 A1 | 9/2011 | Itabashi et al. | |
| 2011/0218706 A1 | 9/2011 | Mori et al. | |
| 2011/0282552 A1 | 11/2011 | Gebregergis et al. | |
| 2012/0041644 A1 | 2/2012 | Turner | |
| 2012/0199414 A1 * | 8/2012 | Shimizu | B62D 5/0463 |
| | | | 180/446 |
| 2012/0232754 A1 | 9/2012 | Champagne et al. | |
| 2012/0261209 A1 | 10/2012 | Shiino | |
| 2012/0312627 A1 | 12/2012 | Morishita et al. | |
| 2013/0024072 A1 | 1/2013 | Michelis et al. | |
| 2013/0030654 A1 * | 1/2013 | Oblizajek | B62D 6/008 |
| | | | 701/42 |
| 2013/0073146 A1 | 3/2013 | Konomi et al. | |
| 2013/0124048 A1 | 5/2013 | Gruener et al. | |
| 2013/0151066 A1 | 6/2013 | Koukes et al. | |
| 2013/0201047 A1 | 8/2013 | Tsai et al. | |
| 2013/0261894 A1 | 10/2013 | Kojima | |
| 2014/0005894 A1 | 1/2014 | Aoki | |
| 2014/0149000 A1 * | 5/2014 | Tamura | B62D 5/0463 |
| | | | 701/42 |
| 2014/0257641 A1 | 9/2014 | Champagne et al. | |
| 2014/0303848 A1 | 10/2014 | Bean et al. | |
| 2014/0324294 A1 | 10/2014 | Champagne | |
| 2015/0012182 A1 | 1/2015 | Flehmig et al. | |
| 2015/0151783 A1 * | 6/2015 | Kitazume | B62D 5/0472 |
| | | | 701/42 |
| 2015/0171667 A1 | 6/2015 | Kai et al. | |
| 2015/0191200 A1 | 7/2015 | Tsubaki et al. | |
| 2016/0001810 A1 * | 1/2016 | Tsubaki | B62D 5/0472 |
| | | | 701/42 |
| 2016/0031481 A1 | 2/2016 | Birsching et al. | |
| 2016/0075371 A1 * | 3/2016 | Varunjikar | B62D 5/0463 |
| | | | 701/43 |
| 2016/0107679 A1 | 4/2016 | Kimura et al. | |
| 2016/0229446 A1 | 8/2016 | Tamaizumi et al. | |
| 2017/0066472 A1 | 3/2017 | Wang et al. | |
| 2017/0066473 A1 | 3/2017 | Yu et al. | |

(56) References Cited

U.S. PATENT DOCUMENTS

| | | | |
|---|---|---|---|
| 2017/0158228 A1 | 6/2017 | She | |
| 2017/0232998 A1* | 8/2017 | Ramanujam | B62D 5/0463 |
| | | | 701/42 |
| 2017/0355396 A1* | 12/2017 | Varunjikar | B62D 5/049 |

FOREIGN PATENT DOCUMENTS

| | | | | |
|---|---|---|---|---|
| CN | 1935576 A | 3/2007 | | |
| CN | 100999223 B | 7/2007 | | |
| CN | 101142548 A | 3/2008 | | |
| CN | 101218146 A | 7/2008 | | |
| CN | 101434258 A | 5/2009 | | |
| CN | 101522504 A | 9/2009 | | |
| CN | 101683867 A | 3/2010 | | |
| CN | 101734277 A | 6/2010 | | |
| CN | 102019957 A * | 4/2011 | | B62D 5/0463 |
| CN | 102019957 A | 4/2011 | | |
| CN | 102556065 A | 7/2012 | | |
| CN | 102806942 A | 12/2012 | | |
| CN | 102917939 A | 2/2013 | | |
| CN | 103079934 A | 5/2013 | | |
| CN | 102556152 A | 7/2013 | | |
| CN | 104044586 A | 9/2014 | | |
| CN | 104334439 A | 2/2015 | | |
| CN | 104755358 A | 7/2015 | | |
| DE | 19634728 C1 | 4/1998 | | |
| DE | 19824914 A1 | 12/1999 | | |
| DE | 19912169 A1 | 7/2000 | | |
| DE | 19912169 A1 * | 7/2000 | | B62D 6/008 |
| DE | 10344279 A1 | 4/2004 | | |
| DE | 102005004726 A1 | 8/2006 | | |
| DE | 102008051552 A1 | 4/2009 | | |
| DE | 102008036001 A1 | 2/2010 | | |
| DE | 102013112901 A1 | 5/2015 | | |
| EP | 0353995 A2 | 2/1990 | | |
| EP | 1127775 A1 | 8/2001 | | |
| EP | 1508495 A2 | 2/2005 | | |
| EP | 1623907 A1 | 2/2006 | | |
| EP | 1995150 A2 | 11/2008 | | |
| EP | 2028080 A1 | 2/2009 | | |
| EP | 1808359 B1 | 4/2009 | | |
| EP | 2184218 A2 | 5/2010 | | |
| EP | 2275323 A1 | 1/2011 | | |
| EP | 2223838 B1 | 11/2011 | | |
| EP | 2492168 A1 | 8/2012 | | |
| EP | 2497698 A1 | 9/2012 | | |
| GB | 2454788 A | 5/2009 | | |
| JP | 2001106099 A | 4/2001 | | |
| JP | 2003002222 A | 1/2003 | | |
| JP | 3712876 B2 | 11/2005 | | |
| JP | 2006143151 A | 6/2006 | | |
| JP | 3819261 B2 | 9/2006 | | |
| JP | 2006248250 A | 9/2006 | | |
| JP | 2007514602 A | 6/2007 | | |
| JP | 2009006985 A | 1/2009 | | |
| JP | 2009051292 A | 3/2009 | | |
| JP | 2011051409 A | 3/2011 | | |
| KR | 2006083578 A | 7/2006 | | |
| WO | 2005097577 A1 | 10/2005 | | |
| WO | 2011148240 A1 | 12/2011 | | |
| WO | WO-2012014399 A1 * | 2/2012 | | B62D 5/0463 |
| WO | 2012066704 A1 | 5/2012 | | |
| WO | 2012176553 A1 | 12/2012 | | |

OTHER PUBLICATIONS

Disturbance adaptive steering wheel torque control for enhanced path tracking of autonomous vehiclesDongpil Lee;& nbsp;Kyongsu Yi; 2017 American Control Conference (ACC); Year: 2017; pp. 2321-2326 (Year: 2017).*

Precise tuning for power steering; Athira Vijayan et al.;2017 International Conference on Wireless Communications, Signal Processing and Networking (WiSPNET); pp. 2309-2313. (Year: 2017).*

Friction Compensation Control for Power Steering; Frédéric Wilhelm et al.; IEEE Transactions on Control Systems Technology; vol. 24, issue 4; pp. 1354- 1367; IEEE Journals & Magazines. (Year: 2016).*

CN Application No. 2014106438448 Second Office Action, dated Apr. 24, 2017, 9 pages.

CN Application No. 201510742251 First Office Action dated Apr. 26, 2017, 8 pages.

English Abstract of Li Yong et al., Control Technique of Vehicle Stability, Jan. 31, 2013, Mechanical Industry Press, 1 page.

Gillespie, Thomas D., Fundamentals of Vehicle Dynamics, 2000, pp. 201-208, Society of Automotive Engineers—Authorized Simplified Chinese translation edition by Scientific & Technical Publishing Co., 2006, pp. 138-142 (correspond to original pp. 201-208).

Gillespie, Thomas D., Fundamentals of Vehicle Dynamics, 2000, pp. 201-208, Society of Automotive Engineers.

Li Yong et al., Control Technique of Vehicle Stability, Jan. 31, 2013, pp. 137-138, Mechanical Industry Press.

Ansgar Rehm, Vehicle Velocity Estimation by Dynamic Inversion of Wheel Force Generation; Control Conference (ECC), 2009 European Year: 2009; pp. 4798-4803.

China Patent Application No. 201210586416.7 3rd Office Action dated Feb. 15, 2016 14 pages.

D.I. Katzourakis, et al.; "Steering Force Feedback for Human-Machine-Interface Automotive Experiments"; IEEE Transactions on Instrumentation and Measurement, vol. 60, No. 1, pp. 32-43, Jan. 2011.

English Translation of Chinese Office Action for related CN Application No. 20121058416.7; dated Dec. 3, 2014; 15 pages.

English Translation of Chinese Office Action for related CN Application No. 201210586416.7; dated Aug. 12, 2015; 14 pages.

English Translation of CN Chinese Office Action for related Chinese Application No. CN201410086920.X, dated May 23, 2016, 17 pages.

English Translation of CN Office Action & Search Report for related CN Application No. 201410086920.X; dated Nov. 5, 2015; 10 pages.

English Translation of CN Office Action & Search Report for related CN Application No. 2014110331120.X; dated Nov. 30, 2015; 9 pages.

EP Search Report for related EP Application No. 14166178.5; dated Aug. 22, 2014; 7 pages.

EP SR dated Apr. 13, 2016.

European Patent Application No. 14192466.2; office action dated Feb. 5, 2016; 7 pages.

Extended EP Search Report for related EP Application No. 12192967.3, dated Apr. 2, 2013; 8 pages.

Extended EP Search Report for related EP Application No. EP14192466.2; dated Apr. 9, 2015; 8 pages.

Extended EP Search report from related Application No. 15184544.3-1755: dated: Mar. 14, 2016; 7 pages.

Extended European Search Report for related EP Application No. 14156987.1; dated Jan. 21, 2015; 8 pages.

Extended European Search Report for related EP Application No. 15173865.5; dated Nov. 23, 2015; 10 pages.

Gillespie, T.D.; "Fundamentals of Vehicle Dynamics"; Warrendale, PA; Society of Automotive Engineers; 1992; ISBN 1560911999, 9781560911999; pp. 205-206.

J.C.F. de Winter, et al.; "A Two-Dimensional Weighting Function for a Driver Assistance System"; IEEE Transactions on Systems, Man and Cybernetics B, Cybern., vol. 38, No. 1, pp. 189-198, Feb. 2008.

Katzourakis, D.I., et al.; "Road-Departure Prevention in an Emergency Obstacle Avoidance Situation"; IEEE Transactions on Systems, Man, and Cybernetics: Systems; vol. 44, Issue 5; vol. 44, No. 5, pp. 621-629.

Peroutka, et al., Design Considerations for Control of Traction Drive with Permanent Magnet Synchronous Machine; Power Electronics and MOtion Control Conference, 2008, EPE-PEMC 2008, 13th Year: 2008; pp. 1529-1534, DOI: 10.1109/EPEPEMC.2008.4635484.

Pornsarayouth, S., et al., Sensor Fusion of Delay and Non-delay Signal using Kalman Filter with Moving Covariance, Robotics and

(56) References Cited

OTHER PUBLICATIONS

Biomimetics, 2008, ROBIO 2008, IEEE International Conference on: Year 2009; pp. 2045-2049, DOI: 10.1109/ROBIO.2009.4913316.

U.S. Appl. No. 13/299,407, filed Nov. 18, 2011, titled Road Wheel Disturbance Rejection.

U.S. Appl. No. 13/792,897, filed Mar. 11, 2013, titled "Road Wheel Disturbance Rejection Based on Hand Wheel Acceleration".

Van der Jagt, Pim; "Prediction of Steering Efforts During Stationary or Slow Rolling Parking Maneuvers"; Ford Forschungszentrum Aachen GmbH.; Oct. 27, 1999; 20 pages.

Wilhelm, et al., Friction Compensation Control for Power Steering, Control Systems Technology, IEEE Transactions on; Year: 2015, vol. PP, Issue: 99; pp. 1-14, DOI:10.1109/TCST.2015.2483561.

English Translation of German Office Action for German Application No. 102016116291.4 dated Mar. 5, 2018, 5 pages.

English Translation of German Office Action for German Application No. 102016116292.2 dated Mar. 5, 2018, 5 pages.

English Translation of Chinese Office Action & Search Report for Chinese Application No. 201611113750.5 dated Apr. 25, 2018, 10 pages.

English Translation of Chinese Office Action & Search Report for Chinese Application No. 201611113886.6 dated Apr. 27, 2018, 7 pages.

Hsu, Yung-Hsiang Judy, "Estimation and Control of Lateral Tire Forces using Steering Torque"; Dissertaion of Stanford University, Mar. 2009; 191 pages.

\* cited by examiner

MODIFIED STATIC TIRE MODEL FOR PROVIDING ASSIST WITHOUT A TORQUE SENSOR FOR ZERO TO LOW VEHICLE SPEEDS

CROSS-REFERENCES TO RELATED APPLICATIONS

This application is a continuation-in-part application of U.S. application Ser. No. 14/486,392, filed on Sep. 15, 2014, which is incorporated herein by reference in entirety.

BACKGROUND

In a typical electric power steering (EPS) system of a vehicle, a hand wheel torque sensor is used to determine the driver requested assist torque. When the hand wheel torque sensor becomes un-enabled and does not function properly, the EPS system may not be able to provide the steering assist torque. Some methods provide loss of assist detection for rolling vehicle speeds.

SUMMARY

In one embodiment of the invention, a method of controlling an electric power steering system of a vehicle is provided. The method estimates steering rack force to be caused by a tire of the vehicle and a surface of a ground with which the tire is in contact in response to determining that one or more hand wheel torque sensors of the vehicle are not enabled. The method generates a steering assist torque command based on the estimated steering rack force. The method controls the electric power steering system using the steering assist torque command.

In another embodiment of the invention, a system of a vehicle comprises a control module and a power steering system that includes one or more hand wheel torque sensors. The control module is configured to estimate steering rack force to be caused by a tire of the vehicle and a surface of a ground with which the tire is in contact in response to determining that one or more of the hand wheel torque sensors are not enabled. The control module is further configured to generate a steering assist torque command based on the estimated steering rack force. The control module is further configured to control the electric power steering system using the steering assist torque command.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
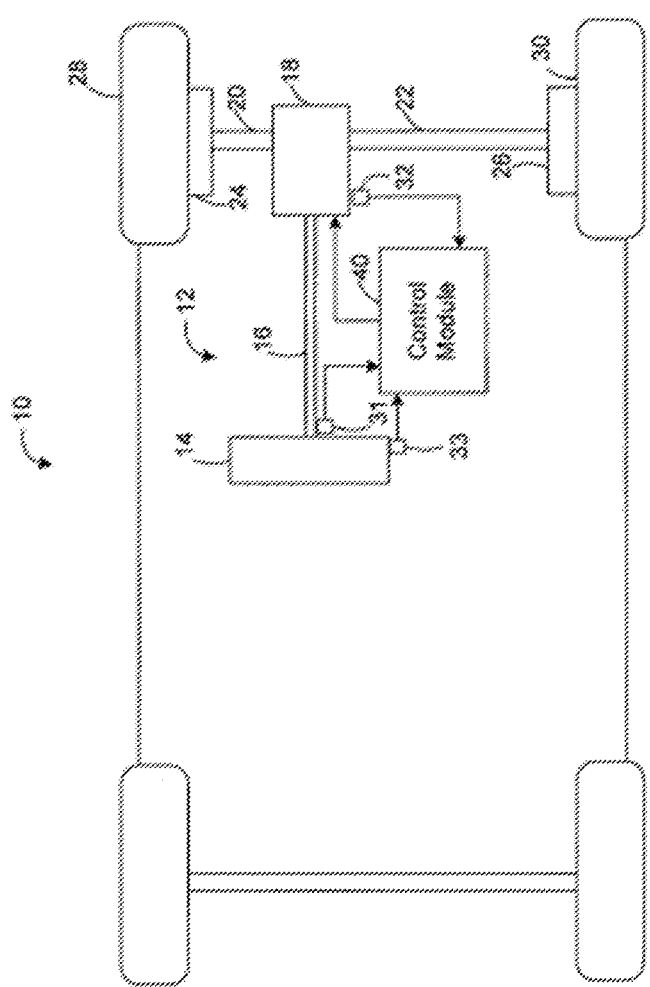
FIG. 1 illustrates a functional block diagram of a steering system that includes an assist torque calculation system in accordance with exemplary embodiments of the invention.

The following description is merely exemplary in nature and is not intended to limit the present disclosure, its application or uses. It should be understood that throughout the drawings, corresponding reference numerals indicate like or corresponding parts and features.

Referring now to FIG. 1, where the invention will be described with reference to specific embodiments without limiting same, an exemplary embodiment of a vehicle 10 including a steering system 12 is illustrated. In various embodiments, the steering system 12 includes a hand wheel 14 coupled to a steering shaft 16. In one exemplary embodiment, the steering system 12 is an electric power steering (EPS) system that further includes a steering assist unit 18 that couples to the steering shaft 16 of the steering system 12 and to tie rods 20, 22 of the vehicle 10. The steering assist unit 18 includes, for example, a rack and pinion steering mechanism (not shown) that may be coupled through the steering shaft 16 to a steering actuator motor and gearing (hereinafter referred to as the steering actuator). During operation, as the hand wheel 14 is turned by a vehicle operator (i.e., a driver), the motor of the steering assist unit 18 provides the assistance to move the tie rods 20, 22 which in turn moves steering knuckles 24, 26, respectively, coupled to roadway wheels 28, 30, respectively of the vehicle 10. Although an EPS system is illustrated in FIG. 1 and described herein, it is appreciated that the steering system 12 of the present disclosure can include various controlled steering systems including, but not limited to, steering systems with hydraulic configurations, and steer by wire configurations.

As shown in FIG. 1, the vehicle 10 further includes various sensors 31-33 that detect and measure observable conditions of the steering system 12 and/or of the vehicle 10. The sensors 31-33 periodically or continuously generate sensor signals based on the observable conditions. In various embodiments, the sensors 31-33 include, for example, a hand wheel torque sensor, a hand wheel angle sensor, a hand wheel velocity sensor, roadway wheel velocity sensors, and other sensors. In one embodiment, some of these sensors have redundant or backup sensors to validate or complement the sensor signals. The sensors 31-33 send the signals to the control module 40.

In various embodiments, a control module 40 controls the operation of the steering system 12 and/or the vehicle 10 based on one or more of the enabled sensor signals and further based on the assist torque calculation systems and methods of the present disclosure. Generally speaking, the methods and systems in various embodiments of the invention generate an assist torque command without using a hand wheel torque signal, which typically indicates the driver-requested assist, when the hand wheel torque sensor supplying the hand wheel torque signal becomes un-enabled or faulty. Specifically, the methods and systems utilize a modified static tire model to estimate rack load or steering rack force when the vehicle is stationary or moving at a relatively low velocity (e.g., at about 10 kilometers per hour or below). The methods and systems generate a scale factor based on the hand wheel angle, the hand wheel velocity, the vehicle velocity and a previously generated assist torque command. The methods and systems generate an assist torque command by scaling the estimated steering rack force with the scale factor.

Figure 2:
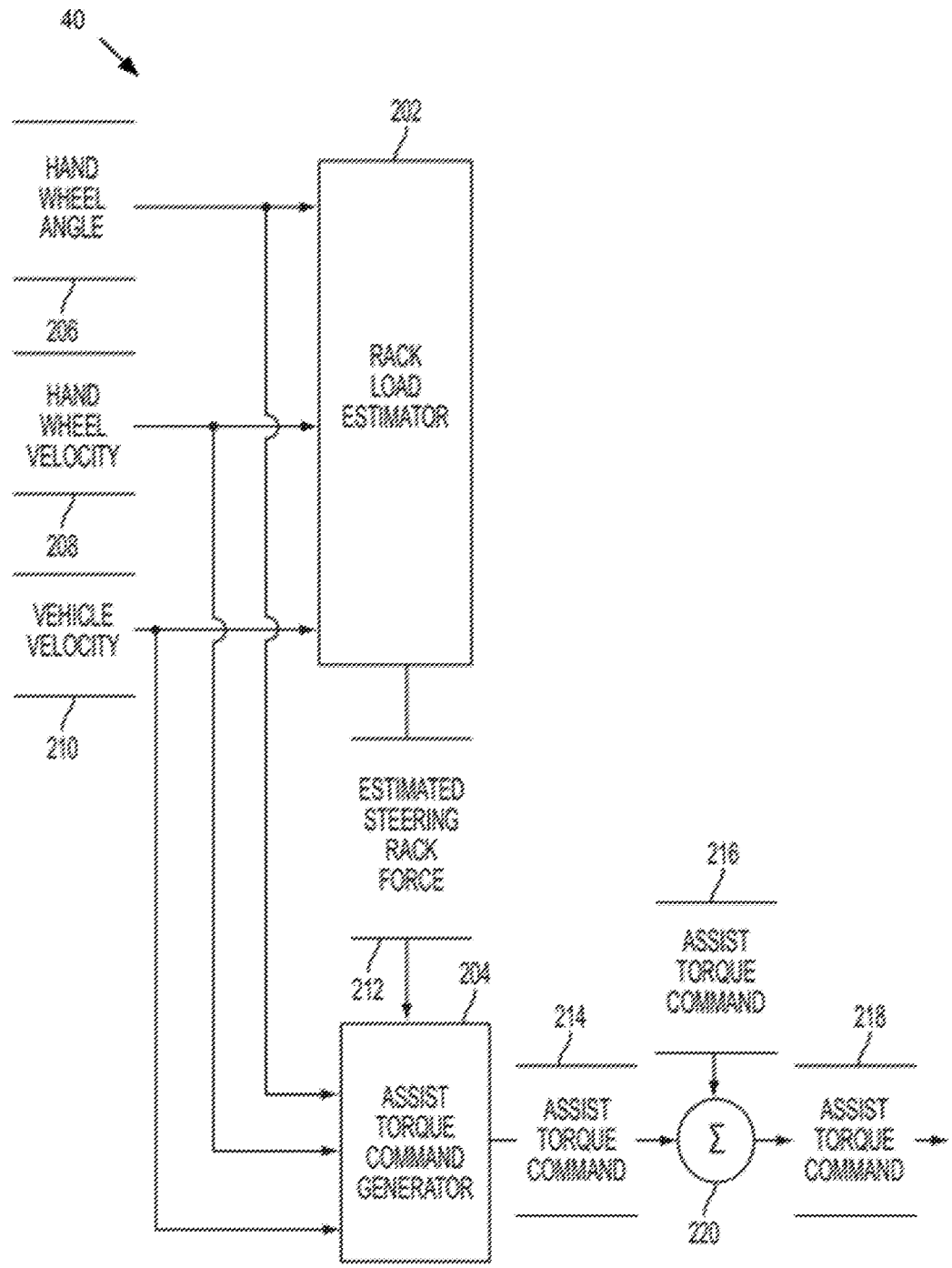
FIG. 2 illustrates a dataflow diagram illustrating an assist torque calculation system in accordance with exemplary embodiments of the invention.

FIG. 2 depicts a dataflow diagram of the control module 40 of FIG. 1 that is used to control the steering system 12 and/or the vehicle 10 of FIG. 1. In various embodiments, the control module 40 can include one or more sub-modules and datastores, such as a rack load estimator 202 and an assist torque command generator 204. As used herein the terms module and sub-module refer to an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules shown in FIG. 2 can be combined and/or further partitioned to similarly generate an assist torque command. As can be appreciated, the sub-modules shown in FIG. 2 can be implemented as a single control module 40 (as shown) or multiple control modules (not shown). Inputs to the control module 40 can be generated from the sensors of the vehicle 10 (FIG. 1), can be modeled within the control module 40 (e.g., by other sub-modules (not shown)), can be received from other control modules (not shown), and/or can be predefined.

As known, rack load or steering rack force is caused by one or more tires of the vehicle and the surface of the ground with which the tires are in contact as the tire plane(s) relative to the surface is rotated (by steering the hand wheel). In order to steer the hand wheel to the desired position, the steering rack force has to be overcome by a torque in addition to a torque to rotate the hand wheel. The rack load estimator 202 is configured to estimate the steering rack force and generates an estimated steering rack force signal 212 indicating the steering rack force based on a hand wheel angle or position signal 206, a hand wheel velocity signal 208 and a vehicle velocity signal 210. The hand wheel angle signal 206, the hand wheel velocity signal 208 and the vehicle velocity signal 210 indicate hand wheel angle values, hand wheel velocity values and vehicle velocity values, respectively, detected by the various sensors 31-33 of FIG. 1. In some embodiments, the hand wheel velocity signal 208 may be derived from the hand wheel angle signal 206 based on an algorithm for calculating hand wheel velocity values from the hand wheel angle values at different instances in time, instead of being generated by a hand wheel velocity sensor. In some embodiments, the rack load estimator 202 utilizes a modified static tire model to estimate the steering rack force. More details about the rack load estimator 202 and the modified static tire model will be described further below by reference to FIG. 3.

The assist torque command generator 204 generates an assist torque command 214, which is periodic or continuous signal indicative of the amount of assist torque. The assist torque command 214 is for commanding the motor of the steering assist unit 18 of FIG. 1 to generate assist torque to aid the driver of the vehicle when the vehicle is stationary or moving at a relatively low velocity (e.g., at about 10 kilometers per hour (kph) or below). Specifically, the assist torque command generator 204 generates a scale factor based on the hand wheel angle signal 206, the hand wheel velocity signal 208 and the vehicle velocity signal 210. The assist torque command generator 204 generates the assist torque command 214 by scaling the estimated steering rack force signal 212 with the scale factor. More details about the assist torque command generator 204 will be described further below by reference to FIG. 4.

In some embodiments, the assist torque command 214 is blended by the blender 220 with another assist torque command 216, which is also generated without using a hand wheel torque signal from a hand wheel torque sensor. Specifically, the assist torque command 216 is generated by other sub-modules (not shown) of the control module 40 based on a lateral acceleration of the vehicle estimated from the hand wheel angle signal. In some embodiments, the blender 220 blends the assist torque commands 214 and 216 by adding the commands. Generating the assist torque command 216 is described in U.S. patent application Ser. No. 14/263,162, filed Apr. 28, 2014, which is incorporated herein by reference in its entirety. In these embodiments, a blend of the assist torque commands 214 and 216 is sent to the motor as an assist torque command 218.

Figure 3:
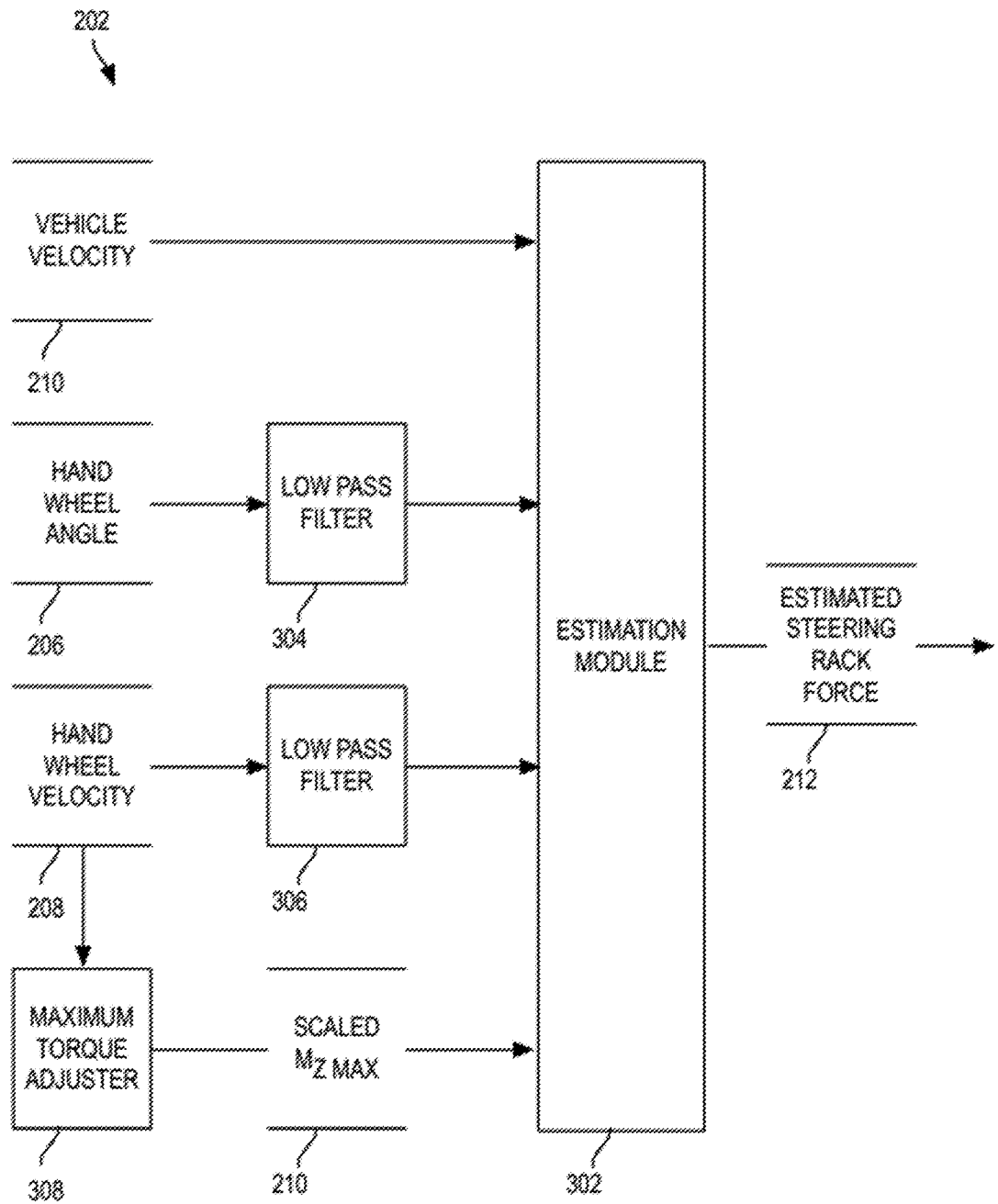
FIG. 3 depicts a dataflow diagram of a rack load estimator in accordance with exemplary embodiments of the invention.

FIG. 3 depicts a dataflow diagram of the rack load estimator 202 of FIG. 2, which utilizes a modified static tire model to estimate the steering rack force. A static tire model for estimating hand wheel torque is described in van der Jagt, Pim, "Prediction of Steering Efforts During Stationary or Slow Rolling Parking Maneuvers," Ford Forschungszentrum Aachen GmbH., Oct. 27, 1999, which is incorporated herein by reference in its entirety. This static tire model is referred to as "Van der Jagt static tire model" in the present disclosure. In some embodiments, the rack load estimator 202 utilizes a modified Van der Jagt static model to estimate the hand wheel torque.

The Van der Jagt static model includes the following equation for estimating steering rack force to be caused by the tire and the surface of the ground with which the tire is in contact:

$$M_z = K_\Psi \cdot \Psi \quad \text{(Equation 1)}$$

where $K_\Psi$ is the torsional stiffness of the tire; $\Psi$ is the yaw angle of the wheel plane for the tire; and $M_z$ is the steering rack force to be caused by the tire. Different tires have different torsional stiffness.

The Van der Jagt static model further includes the following two equations:

$$\dot{\Psi}_{def} = (1 - |M_z/M_{z\,max}|) \cdot \dot{\Psi} \text{ if } \text{sign}(\Psi_{def}) = \text{sign}(\dot{\Psi}) \quad \text{(Equation 2)}$$

$$\dot{\Psi}_{def} = \dot{\Psi} \text{ if } \text{sign}(\Psi_{def}) \neq \text{sign}(\dot{\Psi}) \quad \text{(Equation 3)}$$

where $\dot{\Psi}$ is a time derivative of the yaw angle $\Psi$ of the wheel plane; $\Psi_{def}$ is the torsional deflection (i.e., deformation angle) of the tire as the hand wheel rotates; $\dot{\Psi}^{def}$ is a time derivative of $\Psi_{def}$; $M_{z\,max}$ is the maximum torque that can be generated by the tire; and sign( ) is a function that returns the sign (e.g., a positive and a negative) of the input value. Equation 2 defines the time derivative $\dot{\Psi}_{def}$ of torsional deflection $\Psi_{def}$ of the tire when the sign of $\Psi_{def}$ is the same as the sign of the time derivative of the yaw angle $\Psi$ (i.e., when the direction of the deflection of the tire and the direction of the yaw angular velocity of the wheel plane are the same). Equation 3 defines the time derivative $\dot{\Psi}_{def}$ of torsional deflection $\Psi_{def}$ of the tire when the sign of $\Psi_{def}$ is the same as the sign of the time derivative of the yaw angle $\Psi$ (i.e., when the direction of the deflection of the tire and the direction of the yaw angular velocity of the wheel plane are opposite). Equations 2 and 3 show nonlinearities between the steering rack force and the hand wheel angle.

The Van der Jagt static model further includes the following equations for estimating the steering rack force when the vehicle is stationary:

$$\Psi_{defm} = M_{z\,max}/K_\Psi \quad \text{(Equation 4)}$$

$$\Psi_{def} = \int_0^n \Psi_{def} \partial t \quad \text{(Equation 5)}$$

$$M_z = K_\Psi \cdot \Psi_{def} \quad \text{(Equation 6)}$$

where $\Psi_{defm}$ is the maximum possible deflection of the tire. Equation 4 shows that the maximum possible deflection of the tire before the tire starts to slip may be calculated by dividing the maximum torque that can be generated by the tire by the torsional stiffness of the tire. Equation 5 shows that the deflection of the tire builds up as the hand wheel rotates. Equation 6 shows that is the steering rack force $M_z$ is estimated by multiplying the torsional stiffness of the tire by the torsional deflection of the tire.

The Van der Jagt static model further includes the following equations for estimating the steering rack force when the vehicle is moving at a relatively slow velocity (e.g., 10 kph or below):

$$\Psi_{def2} = \frac{1}{\tau} \cdot \Psi_{def} \quad \text{(Equation 7)}$$

$$\tau = X_{rel}/(\omega \cdot r) \quad \text{(Equation 8)}$$

$$\Psi_{def} = \int_0^t (\dot{\Psi}_{def} + \Psi_{def2}) \cdot \partial t \quad \text{(Equation 9)}$$

where $\tau$ is a time constant; $\dot{\Psi}_{def2}$ is a time derivative of $\Psi_{def}$; $X_{rel}$ is the tire relaxation length; $\omega$ is the tire rotational velocity; and $r$ is the tire rolling radius. In the Van der Jagt model, it is assumed that the tire have about two thirds of the steady state values (e.g., torsional stiffness and torsional deflection of the tire when the vehicle is stationary) after the tire has rolled over the tire relaxation length. Accordingly, $\tau$ indicates that at time $\tau$ the tire has about two thirds of its steady state value.

In some embodiments, the rack load estimator 202 includes one or more sub-modules and datastores, such as low pass filters 304 and 306, a maximum torque adjuster 308 and an estimation module 302. The rack load estimator 202 uses a modified Van der Jagt static model to estimate the steering rack force. Specifically, the low pass filters 304 and 306 filter the hand wheel angle signal 206 and the hand wheel velocity signal 208, respectively. The low pass filters 304 and 306 remove noise from the hand wheel angle signal 206 and the hand wheel velocity signal 208 and add a time delay to the hand wheel angle signal 206 and the hand wheel velocity signal 208. This time delay makes the estimation of the steering rack road more accurate because the delay synchs up the phases of the hand wheel angle signal 206 and the hand wheel velocity signal 208 with the motion of the tire. The motion of the hand wheel precedes the motion of the tire because the motion of the tire is caused by the motion of the hand wheel.

The estimation module 302 modifies the Van der Jagt static tire model by replacing the tire steering coordinates in the equations 1-9 of the Van der Jagt static tire model with the hand wheel angle values, the hand wheel velocity values and the vehicle velocity values. For instance, the hand wheel angle is used instead of the yaw angle $\Psi$ of the wheel plane for the tire, and the hand wheel velocity is used instead of the time derivative $\dot{\Psi}$ of the yaw angle $\Psi$ of the wheel plane.

The maximum torque adjuster 308 further modifies the equations of the Van der Jagt static tire model by adjusting the maximum torque value that can be generated by the tire. In the Van der Jagt static tire model, it is assumed that the surface of the ground is a dry pavement. That is, it is assumed that the surface friction is a constant. In order to make the estimation of the steering rack force in light of the road friction changes, nonlinearities and other un-modeled dynamics, the maximum torque adjuster 308 scales down the maximum torque $M_{z\,max}$ that can be generated by the tire.

In some embodiments, the maximum torque adjuster 308 generates a scalar factor based on the hand wheel velocity and scales down $M_{z\,max}$ by multiplying $M_{z\,max}$ by the scale factor. Specifically, the maximum torque adjuster 308 uses a threshold hand wheel velocity value that is determined empirically. The threshold hand wheel velocity is used for determining whether the hand wheel velocity indicates that the vehicle is on a low friction surface. That is, in some embodiments, if the hand wheel velocity is greater than the threshold hand wheel velocity, the maximum torque adjuster 308 determines that the vehicle is on a low friction surface (e.g., on an icy road) and sets the scale factor to a small value (e.g., 1/20 or 0.05). If the hand wheel velocity is less than or equal to the threshold hand wheel velocity, the maximum torque adjuster 308 determines that the vehicle is not on a low friction surface and sets the scale factor to a value (e.g., one) in order not to scale down $M_{z\,max}$. In some embodiments, the maximum torque adjuster 308 limits the rate of the change of the scaling factor in order to scale $M_{z\,max}$ smoothly. For instance, the maximum torque adjuster 308 limits the rising rate to 0.05 (i.e., the scaling factor increases such that $M_{z\,max}$ rises by 0.05 times per unit time) and limits the decreasing rate to −50 (i.e., the scaling factor decreases by not more than 50 times for a unit time). The maximum torque adjuster 308 multiplies $M_{z\,max}$ by the scale factor to scale $M_{z\,max}$. The maximum torque adjuster 308 sends the scaled $M_{z\,max}$ 310 to the estimation module 302, which generates the estimated steering rack force signal 212.

Figure 4:
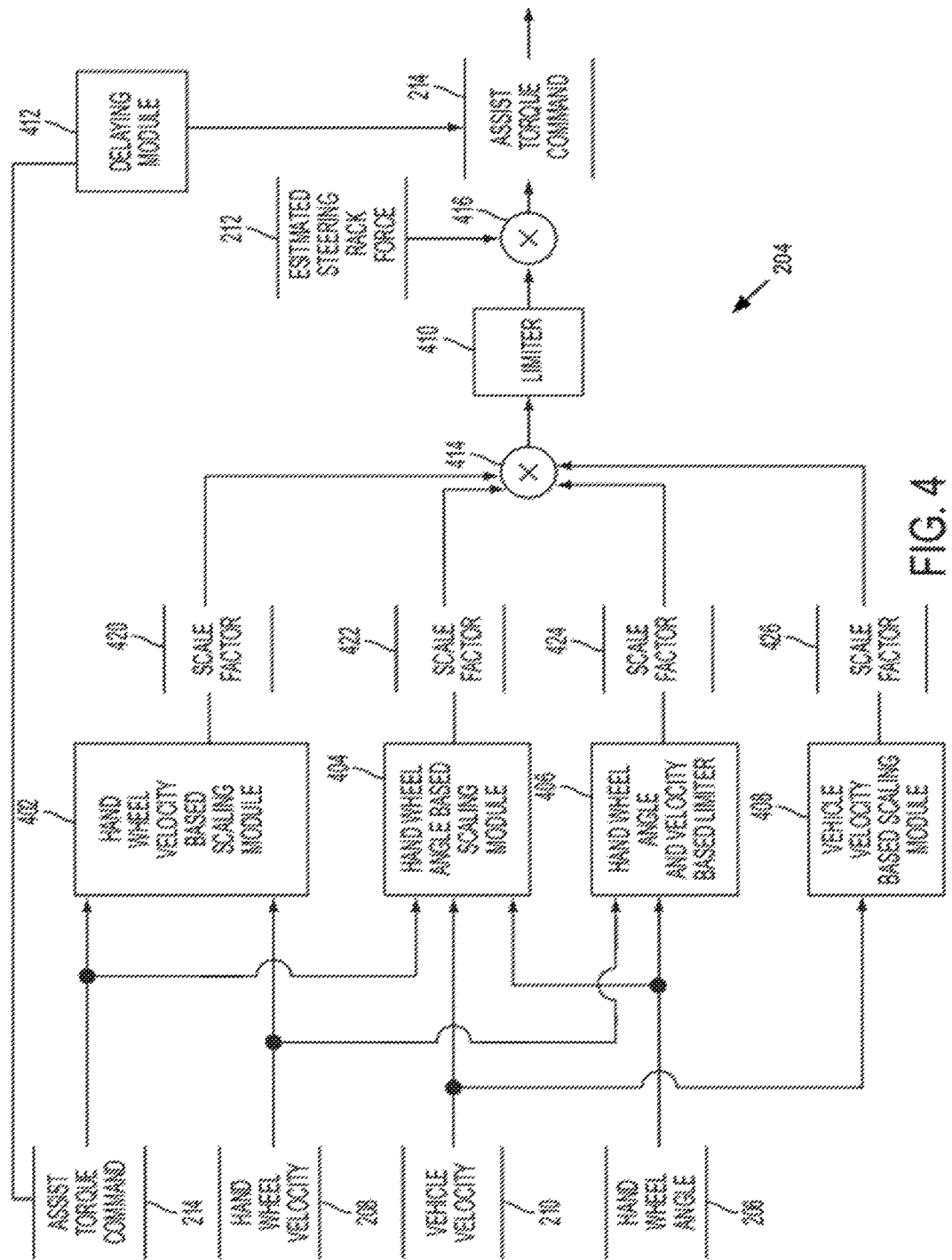
FIG. 4 depicts a dataflow diagram of an assist torque command generator in accordance with exemplary embodiments of the invention.

FIG. 4 depicts a dataflow diagram of the assist torque command generator 204 of FIG. 2. In some embodiments, the assist torque command generator 204 includes one or more sub-modules and datastores, such as a hand wheel velocity based scaling module 402, a hand wheel angle based scaling module 404, a hand wheel velocity and angle based limiter 406, a vehicle velocity based scaling module 408, a limiter 410, a delaying module 412, and multipliers 414 and 416.

The hand wheel velocity based scaling module 402 takes as input the assist torque command 214 previously generated by the assist torque command generator 204 and the hand wheel velocity signal 208. The hand wheel velocity based scaling module 402 generates a scale factor 420 to use to scale down the estimated steering rack force signal 212. The estimated steering rack force signal 212 is scaled with the scale factor 420 such that the output assist torque command 214 generated from the estimated steering rack force signal 212 provides the natural return of the hand wheel to the centered position in the absence of driver-provided torque to the hand wheel.

In some embodiments, the hand wheel velocity based scaling module 402 sets the scale factor 420 to a value (e.g., 0.3) to ramp down the estimated steering rack force signal 212 to 30% when the hand wheel velocity is less than a threshold velocity. The hand wheel velocity based scaling module 402 sets the scale factor 420 to ramp up the estimated steering rack force signal 212 to full values (e.g., about 100%) when the hand wheel velocity is greater than a threshold velocity. The scaling factor 420 is used to ramp up the estimated steering rack force signal 212 when the assist torque command 214 indicates assist torque that is in the same direction as the hand wheel velocity signal 208. The scaling factor 420 is used to ramp down the assist torque command when the assist torque command is in the opposite direction as the hand wheel velocity (i.e., when the assist torque command 214 and the hand wheel velocity have different signs—quadrants II and IV). An example of the hand wheel velocity based scaling module 402 is described in the above-incorporated U.S. patent application Ser. No. 14/263,162.

The hand wheel angle based scaling module 404 takes as input the assist torque command 214 previously generated by the assist torque command generator 204, the vehicle velocity signal 210 and the hand wheel angle signal 206. The hand wheel angle based scaling module 404 generates a scale factor 422 to use to scale down the estimated steering rack force signal 212. The estimated steering rack force signal 212 is scaled with the scale factor 422 such that the output assist torque command 214 generated from the estimated steering rack force signal 212 provides the natural return of the hand wheel to the centered in the absence of driver-provided torque to the hand wheel. More details of the hand wheel angle based scaling module 404 are described further below by reference to FIG. 5.

The hand wheel velocity and angle based limiter 406 takes as input the hand wheel velocity signal 208 and the hand wheel angle signal 206. The hand wheel velocity and angle based limiter 406 generates a scale factor 424 to use to scale down the estimated steering rack force signal 212. The estimated steering rack force signal 212 is scaled with the scale factor 424 such that the output assist torque command 214 generated from the estimated steering rack force signal 212 does not over-assist the driver (i.e., provides assist torque no more than necessary).

In some embodiments, the hand wheel velocity and angle based limiter 406 determines a first gain value using a first gain table indexed by the hand wheel angle values indicated by the hand wheel angle signal 206. The first gain table returns a constant gain (e.g., one) for the hand wheel angle values below a threshold hand wheel angle. The gain value that the first gain table returns gets smaller for a hand wheel angle value above the threshold hand wheel angle as the hand wheel angle value increases. Likewise, the hand wheel velocity and angle based limiter 406 determines a second gain value using a second gain table indexed by the hand wheel velocity values indicated by the hand wheel velocity signal 208. The second gain table returns a constant gain (e.g., one) for the hand wheel velocity values below a threshold hand wheel velocity. The gain value that the second gain table returns gets smaller for a hand wheel velocity value above the threshold hand wheel velocity as the hand wheel velocity value increases. The hand wheel velocity and angle based limiter 406 multiplies the first gain value by the second gain value. The hand wheel velocity and angle based limiter 406 then limits the rate of the change of the product of the first and second gain values to a range so that the value of the product changes smoothly. The resulting product is the scale factor 424.

The vehicle velocity based scaling module 408 takes as input the vehicle velocity signal 210. The vehicle velocity based scaling module 408 generates a scale factor 426 to use to scale down the estimated steering rack force signal 212. The estimated steering rack force signal 212 is scaled with the scale factor 426 such that the output assist torque command 214 generated from the estimated steering rack force signal 212 is scaled down progressively to zero as the vehicle velocity increases. Specifically, in some embodiments, the vehicle velocity based scaling module 408 determines a speed dependent gain using a speed dependent gain table that is indexed by the vehicle velocity values indicated by the vehicle velocity signal 210. The gain value that this speed dependent gain table returns gets larger as the vehicle velocity increases. The gain value saturates once the vehicle velocity reaches above a threshold vehicle velocity. This vehicle velocity based scaling module 408 then limits this gain value to a range (e.g., a range from zero to one). The resulting gain value is the scale factor 426.

In some embodiments, the multiplier 414 multiples the four scale factors 420, 422, 424 and 426 together and sends this product of the four scale factors to the limiter 410, which limits this product to a range (e.g., a range from zero to one). The multiplier 416 then generates the output assist torque command 214 by multiplying the estimated steering rack force by the product of the four scale factors. The output assist torque command 214 is delayed by the delaying module 412 by, for example, a unit time and then is supplied to the hand wheel velocity based scaling module 402 and the hand wheel angle based scaling module 404. Also, as discussed above by reference to FIG. 2, the assist torque command 214 gets blended with the assist torque command 216 in some embodiments.

Figure 5:
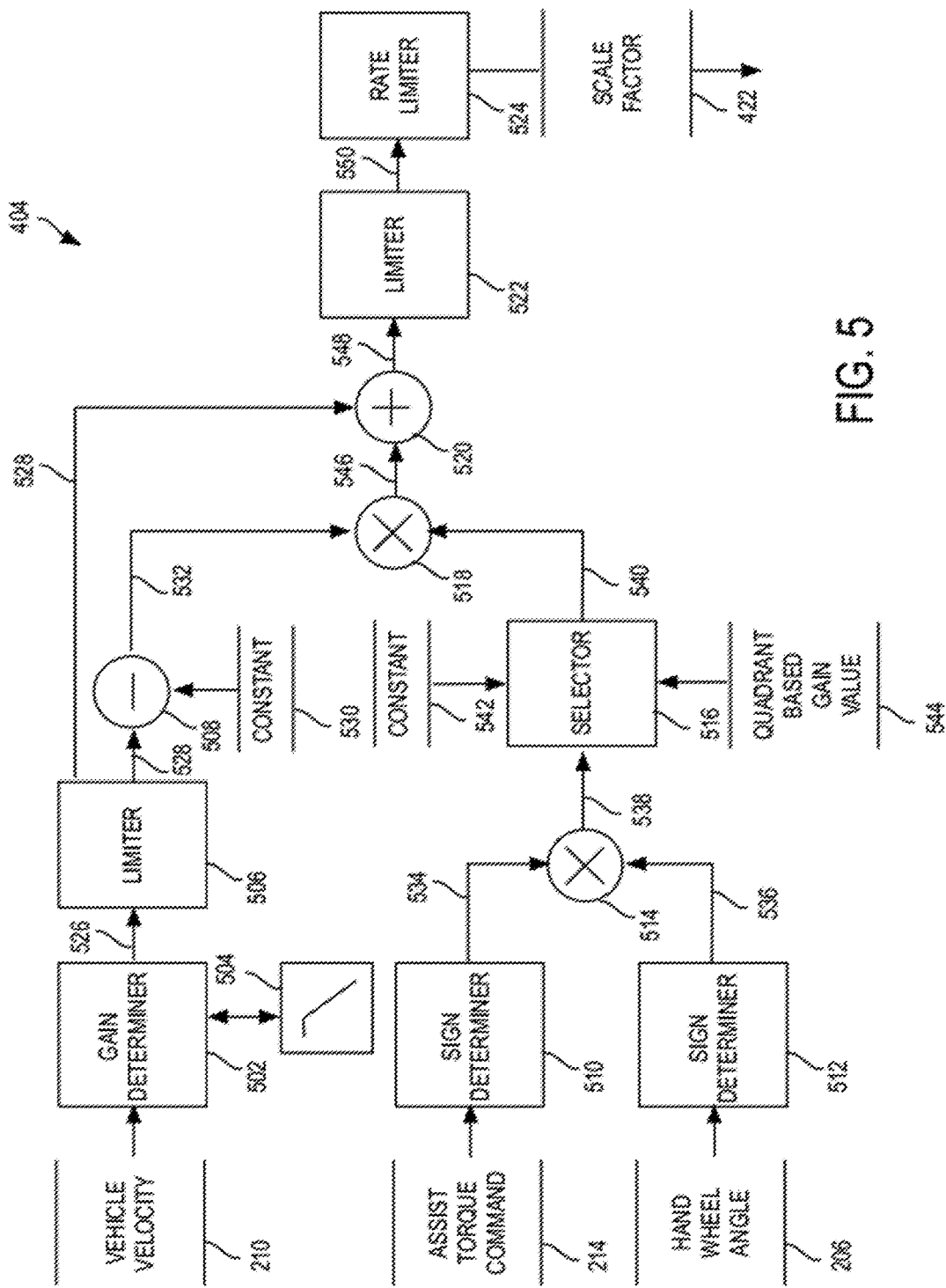
FIG. 5 depicts a dataflow diagram of a hand wheel angle based scaling module in accordance with exemplary embodiments of the invention.

FIG. 5 depicts a dataflow diagram of the hand wheel angle based scaling module 404 of FIG. 4. In some embodiments, the hand wheel angle based scaling module 404 includes one or more sub-modules and datastores, such as a gain determiner 502, a vehicle velocity dependent gain table 504, a limiter 506, a subtractor 508, sign determiners 510 and 512, a multiplier 514, a selector 516, a multiplier 518, a blender 520, a limiter 522, and a rate limiter 524. As described above, the hand wheel angle based scaling module 404 takes as input the assist torque command 214 previously generated by the assist torque command generator 204, the vehicle velocity signal 210 and the hand wheel angle signal 206.

The gain determiner 502 determines a speed dependent gain signal 526 based on the vehicle velocity 210. Specifically, in some embodiments, the gain determiner 502 uses the vehicle velocity dependent gain table 504, which is indexed by the vehicle velocity values indicated by the vehicle velocity signal 210. The speed dependent gain table 504 returns a constant (e.g., one) for a vehicle velocity that is below a threshold vehicle velocity. A gain value that the speed dependent gain table 504 returns gets smaller for a vehicle velocity value above the threshold vehicle velocity as the vehicle velocity value increases.

The limiter 506 limits the speed dependent gain signal 526 to a range of gain values (e.g., a range from zero to one) to generate a limited speed dependent gain signal 528. The subtractor 508 then subtracts the limited speed dependent gain signal 528 from a constant 530 (e.g., one) to generate a gain signal 532.

The sign determiners 510 and 512 each take an input signal and generate a sign signal based on the sign of the input signal values. For instance, when the input signal indicates a negative value, the sign determiners generate −1. When the input signal indicates a positive value, the sign determiners generate +1. When the input signal indicates a zero, the sign determiners generate a zero. The sign determiner 510 takes as an input signal the assist torque command 214 and generates a sign signal 534. The sign determiner 512 takes as an input signal the hand wheel angle signal 206 and generates a sign signal 536.

The multiplier 514 generates a quadrant signal 538 by multiplying the two sign signals 534 and 536. When the quadrant signal 538 indicates a negative value, it means that the sign of the assist torque command 214 is different than the sign of the hand wheel angle 215 (i.e., the second or fourth quadrant in a two-dimensional coordinate system in which the hand wheel angle values and the assist torque values make up the two axis). That is, the hand wheel is steered to the left of the center position and the assist torque indicated by the assist torque command 214 points right, or the hand wheel is steered to the right of the center position and the assist torque points left. When the quadrant signal 538 indicates a positive value, it means that the sign of the assist torque command 214 is the same as the sign of the hand wheel angle 215 (i.e., the first or third quadrant). That is, the hand wheel is steered to the left of the center position and the assist torque indicated by the assist torque command 214 points left, or the hand wheel is steered to the right of the center position and the assist torque points right. When the quadrant signal 538 is a zero, it means either the hand wheel is at the center position or the assist torque indicates by the assist torque command 214 is a zero (i.e., the hand wheel is stationary).

Based on the quadrant signal 538, the selector 516 generates a gain signal 540. Specifically, the selector 516 selects a quadrant based gain value 544 as the gain signal 540 if the quadrant signal 538 indicates a negative value. In some embodiments, the quadrant based gain value 544 is predetermined based on different possible quadrant signal values. The selector 516 selects a constant 542 (e.g., one) as the gain signal 540 if the quadrant signal 538 does not indicate a negative value (i.e., the quadrant signal 538 indicates a positive value or a zero).

The multiplier 518 multiplies the gain signal 532 from the subtractor 508 by the gain signal 540 from the selector 516 to generate a scale factor 546. The blender 520 blends (e.g., adds) the scale factor 546 with the limited speed based gain signal 528 from the limiter 506 to generate a scale factor 548. The limiter 522 limits the scale factor 548 to a range of gain values (e.g., a range from zero to one) to generate a limited speed factor 550. The rate limiter 524 then limits the rate of the change of the limited scale factor 550 to a range so that the value of the limited scale factor 550 changes smoothly over time. The output signal of the rate limiter 524 is the scale factor 422.

Figure 6:
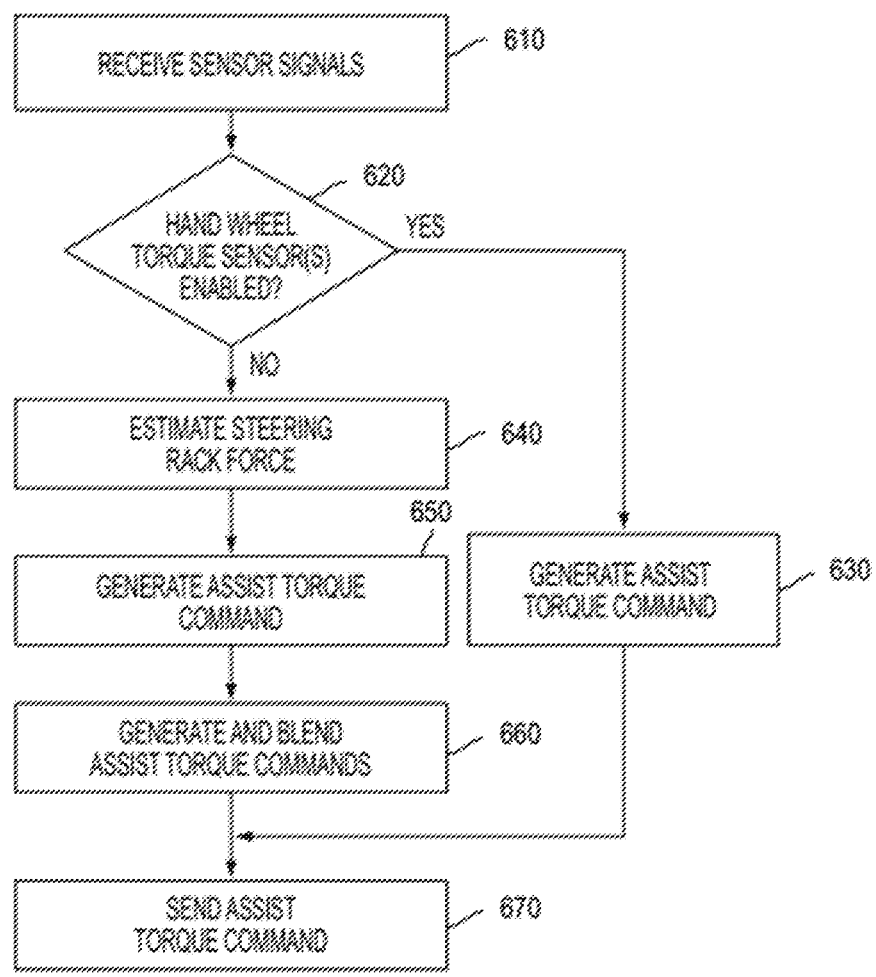
FIG. 6 illustrates a flow diagram of an assist torque command generation method in accordance with exemplary embodiments of the invention.

Referring now to FIG. 6, a flow diagram illustrates an assist torque command generation method that can be performed by the control module 40 of FIG. 1. As can be appreciated in light of the disclosure, the order of operation within the method is not limited to the sequential execution as illustrated in FIG. 6, but may be performed in one or more varying orders as applicable and in accordance with the present disclosure. In various embodiments, the method can be scheduled to run based on predetermined events, and/or run continually during operation of the vehicle 10.

At block 610, the control module 40 receives sensor signals from the sensors 31-33 of FIG. 1. The control module 40 then determines at block 620 whether one or more hand wheel torque sensors of the vehicle 10 are enabled or operating properly. The control module 40 may determine whether the hand wheel torque sensors are enabled by, for example, analyzing the hand wheel torque signals from the sensors. When the control module 40 determines that one or more hand wheel torque sensors are not enabled, the control module 40 proceeds to block 640, which will be described further below. When the control module 40 determines that one or more hand wheel torque sensors are enabled and that at least one hand wheel torque sensor signal is usable, the control module 40 at block 630 generates an assist torque command using the torque sensor signal.

At block 640, the control module 40 estimates or predicts steering rack force to be caused by a tire of the vehicle and a surface of a ground with which the tire is in contact when the vehicle is stationary or moving at a relatively low velocity that is below a threshold velocity. In some embodiments, the control module 40 uses a modified static tire model to estimate the steering rack force. The control module 40 may filter the hand wheel angle signal 206 and the hand wheel velocity signal 208 with the low pass filters 304 and 306, respectively, in order to remove noise from the signals and apply a delay to the signals. The control module 40 may also scale down a maximum value of torque, which the tire is capable of generating, based on the vehicle velocity signal 210.

At block 650, the control module 40 generates the assist torque command 214 based on the steering rack force estimated at block 640. Specifically, in some embodiments, the control module 40 scales down the estimated steering rack force with a product of a plurality of scale factors in order to generate the assist torque command 214 from the estimated steering rack force. The control module 40 generates one scale factor based on previously generated assist torque command 214, the vehicle velocity signal 210 and the hand wheel angle signal 206. The control module 40 generates another scale factor based on the hand wheel angle signal 206 and the hand wheel velocity signal 208. The control module 40 generates another scale factor based on the assist torque command 214, the vehicle velocity signal 210 and the hand wheel angle signal 206. The control module 40 generates another scale factor based on the vehicle velocity signal 210.

At block 660, the control module 40 optionally blends the assist torque command generated at block 640 with another assist torque command the control module 40 may generate. In some embodiments, the control module 40 generates the other assist torque command 216 based on a lateral acceleration of the vehicle estimated from the hand wheel angle signal.

At block 670, the control module 40 controls the EPS system by sending the assist torque command generated at block 630 or 650 or the blend generated at block 660 to the motor of the EPS system.

Figure 7:
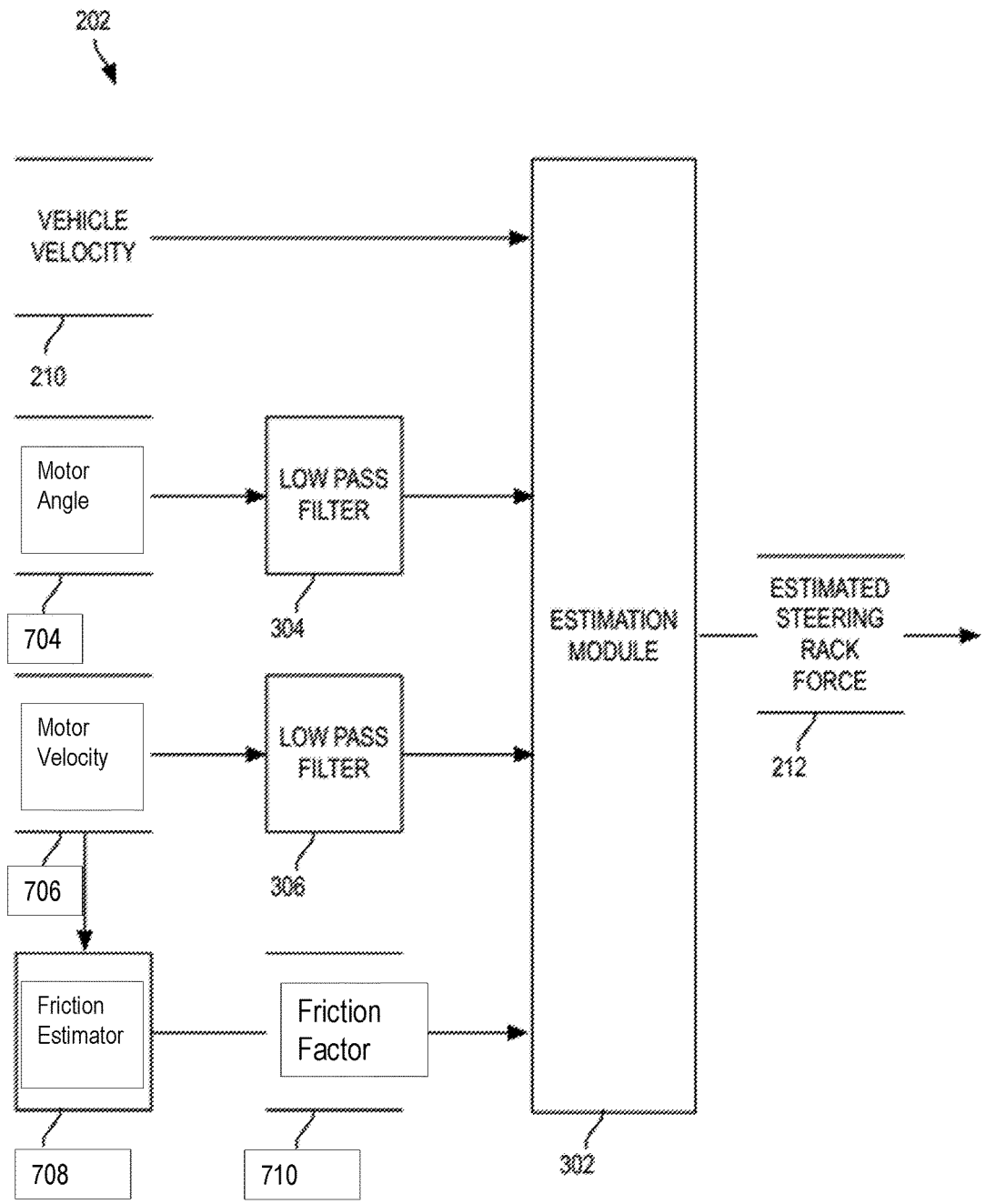
FIG. 7 depicts a dataflow diagram of the rack load estimator in accordance with exemplary embodiments of the invention.

FIG. 7 depicts a dataflow diagram of the rack load estimator 202 of FIG. 2, which utilizes another example of a modified static tire model and an example linear spring model to estimate the steering rack force. In the illustrated example, the estimation module 302 uses the vehicle velocity 210, a motor angle 704, a motor velocity 706, and a friction factor 710 to generate the estimated steering rack force 212. The motor angle 704 and the motor velocity 706 are obtained from the actuator motor in the steering assist module 18. Alternatively or in addition, the estimation module 302 uses the hand wheel angle 206 and the hand wheel velocity 208 as inputs. The motor angle 704 may be passed through the low pass filter 306, and the motor velocity 706 may be passed through the low pass filter 304 prior to the estimation. A friction estimator module 708 computes the friction factor 710.

The estimated steering rack force 212 $M_z$ output by the estimation module 202 of FIG. 7 can be specified as $$M_z = M_{z1} + M_{z2}, \text{ where} \quad \text{(Equation 10)}$$

$$M_{z1} = \mu \cdot K_\Psi \cdot \Psi_{def}, \text{ and} \quad \text{(Equation 11)}$$

$$M_{z2} = K_{\Psi 2} \cdot \Psi \quad \text{(Equation 12)}$$

In the above equations, $M_z$ represents the estimated aligning torque which is composed of $M_{z1}$ and $M_{z2}$, where $M_{z1}$ represents a torque component caused by tire stiffness (see Equation 6 above), and $M_{z2}$ represents a torque component caused by linear spring. As described above, $\Psi$ represents the tire angle, and $K_\Psi$ represents the torsional tire stiffness at the angle $\Psi$. In addition, $K_{\Psi 2}$ represents linear spring stiffness at angle $\Psi$, and $\mu$ represents the friction factor 710 estimated by the friction estimator 708. The linear spring stiffness or torsional tire stiffness represents the torque caused by slipping that the tire of the vehicle experiences, particularly at low vehicle speeds. Additionally or alternatively, the linear spring stiffness represents the torque caused by specific geometry of the suspension of the vehicle.

Further, in comparison to Equations 2 and 3, the estimation module 202 of FIG. 7 may compute the time derivative $\dot{\Psi}_{def}$ of the torsional deflection of the tire as the motor rotates ($\Psi_{def}$) as $$\dot{\Psi}_{def} = \left(1 - \left(\frac{M_{Z1}}{M_{Z1\,max}}\right)^2\right) \cdot \dot{\Psi} \text{ if } \text{sign}(\Psi_{def}) = \text{sign}(\Psi); \quad \text{(Equation 13)}$$

and $$\dot{\Psi}_{def} = \dot{\Psi} \text{ if } \text{sign}(\Psi_{def}) \neq \text{sign}(\Psi) \quad \text{(Equation 14)}$$

Further, in comparison to Equation 5 above, in the estimation module of FIG. 7, $$\Psi_{def,0} = \int_0^\tau (\dot{\Psi}_{def} + \dot{\Psi}_{def2}) \cdot \partial t, \text{ where} \quad \text{(Equation 15)}$$

$$\Psi_{def} = \text{sign}(\Psi_{def,0}) \cdot \min(\Psi_{def,max}, |\Psi_{def,0}|), \text{ where} \quad \text{(Equation 16)}$$

$$\Psi_{def,max} = \mu \cdot M_{Z1,max} / K_\Psi, \text{ and where} \quad \text{(Equation 17)}$$

$$\dot{\Psi}_{def2} = -\frac{1}{\tau}\Psi_{def}, \text{ where } \tau = X_{rel}/(\omega, r) \quad \text{(Equation 18)}$$

Thus, the example estimation module 202 of FIG. 7 uses the friction factor 710 ($\mu$) in estimating the steering rack force 212 ($M_z$). In one or more examples, the friction estimator 708 computes the friction factor 710 at low vehicle speeds such as 0-20 kph.

Figure 8:
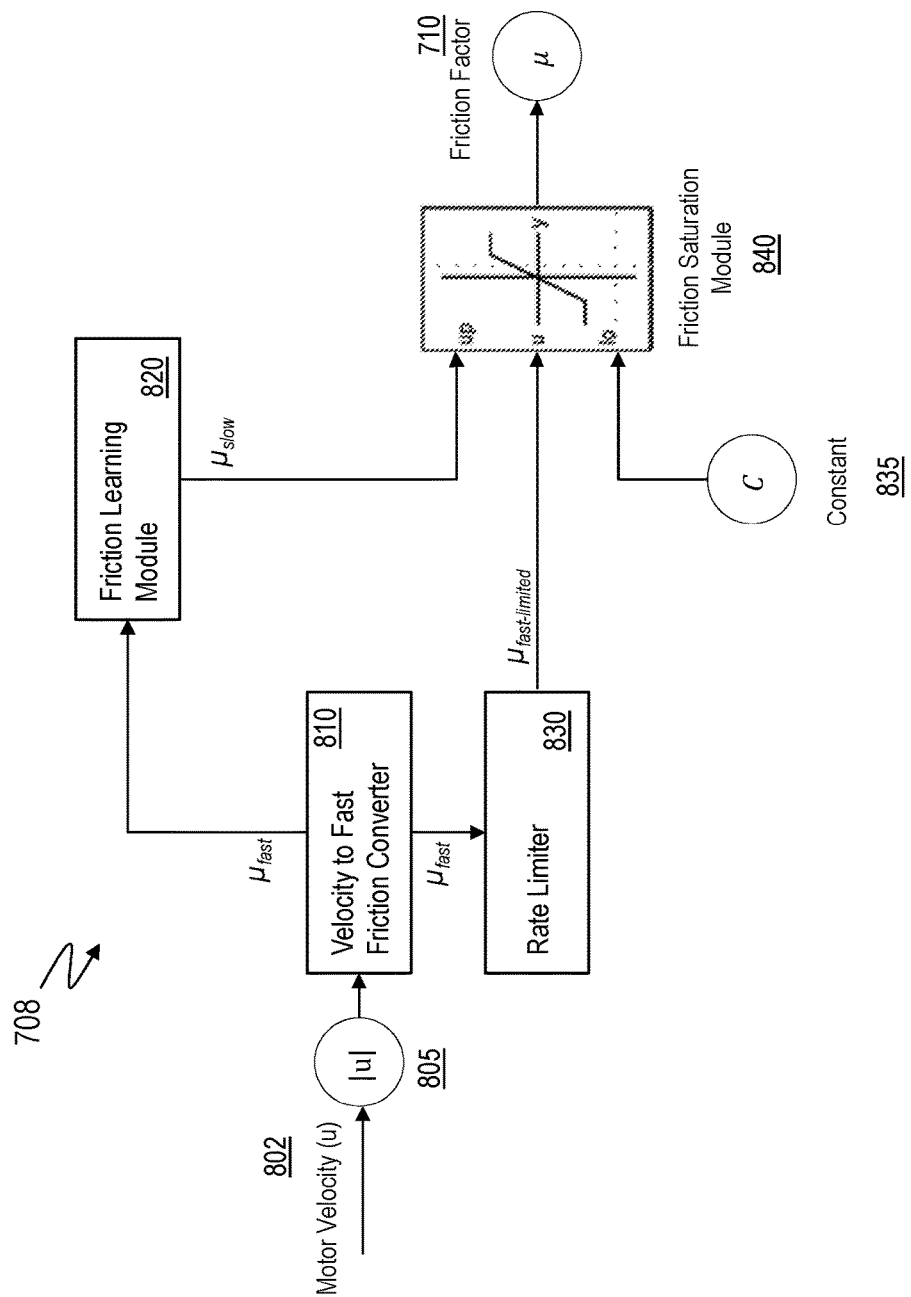
FIG. 8 illustrates a dataflow diagram that includes a friction estimation module in accordance with exemplary embodiments of the invention.

FIG. 8 illustrates example components and an example dataflow of the friction estimator 708. The friction estimator 708 includes hardware such as electronic circuitry. The friction estimator 708, in addition, may include computer executable instructions that control the operations of the friction estimator 708. The friction estimator 708, in addition, may include a memory storage that stores predetermined data and/or data generated and used during the operation of the one or more components of the friction estimator 708. For example, the friction estimator 708 includes components such as a velocity to fast-friction converter 810, a friction-learning module 820, a rate limiter module 830, and a friction saturation module 840, among other components.

For example, the friction estimator 708 receives a motor velocity ($u$) as an input 802. In one or more examples, the friction estimator 708 computes an absolute value of the motor velocity in further operations, as shown at block 805. The motor velocity is forwarded on to the velocity to fast-friction converter 810. The velocity to fast-friction converter 810 converts the motor velocity value to a fast-friction value $\mu_{fast}$. In one or more examples, the velocity to fast-friction converter 810 uses a one-dimensional lookup table to generate the $\mu_{fast}$ value. For example, the lookup table includes $\mu_{fast}$ signal values for known static motor velocity values. The $\mu_{fast}$ value corresponding to the current motor velocity is forwarded to the friction-learning module 820 and the rate limiter 830. In one or more examples, the $\mu_{fast}$ value is determined and forwarded continuously, and thus the $\mu_{fast}$ value may be referred to as a $\mu_{fast}$ signal.

The rate limiter 830 limits the rate of change (or bandwidth) of the $\mu_{fast}$ signal. For example, the rate limiter 830 can output a corresponding $\mu_{fast-limited}$ signal to the friction saturation module 840 at a lower (that is, limited) rate of change (or bandwidth) compared to the frequency at which the motor velocity is input to the friction estimator 708. The rate limiter 830, thus, limits rate of change (derivative) of the output signal, that is, if input to the rate limiter is going from 0 to 1 in one second, the output may go from 0 to 1 in more than one second. Thus, a rate of change (rising or falling) of output is limited using the rate limiter 830. By limiting the rate of change (or bandwidth) in this manner, the rate limiter 830 facilitates the friction factor 710 to be changed after predetermined time duration and avoids sudden changes in the friction estimation. Sudden changes in the friction estimation may alter the estimated steering rack force 212, which may lead to undesirable change in the Static/Low Speed Assist 218.

The friction-learning module 820 analyzes the $\mu_{fast}$ signal and outputs a corresponding $\mu_{slow}$ signal to the friction saturation module 840. The friction-learning module 820 computes the $\mu_{slow}$ signal at a frequency (or rate) slower than the frequency at which the $\mu_{fast}$ signal is output. Furthermore, the $\mu_{slow}$ signal is updated only in certain conditions, as explained later. The friction saturation module 840 receives the $\mu_{fast-limited}$ signal which limited by a variable upper limit and a predetermined lower limit. The $\mu_{slow}$ signal determines the upper limit applied to $\mu_{fast-limited}$ signal by the friction saturation module 840. The friction saturation module 840 also accesses a constant (C), which is a predetermined lower threshold level (limit) for the estimated friction factor 710, as shown at block 835. The constant C may have different values in different examples, for example 0, 0.01, 0.5, and so on. The friction saturation module 840 outputs the estimated friction factor 710 ($\mu$) based on the $\mu_{slow}$ signal from the friction-learning module 820, the $\mu_{fast-limited}$ signal that is limited by the rate limiter 830, and the constant C. Thus, the friction estimator 708 uses the motor velocity to predict the friction factor 710, $\mu$.

Figure 9:
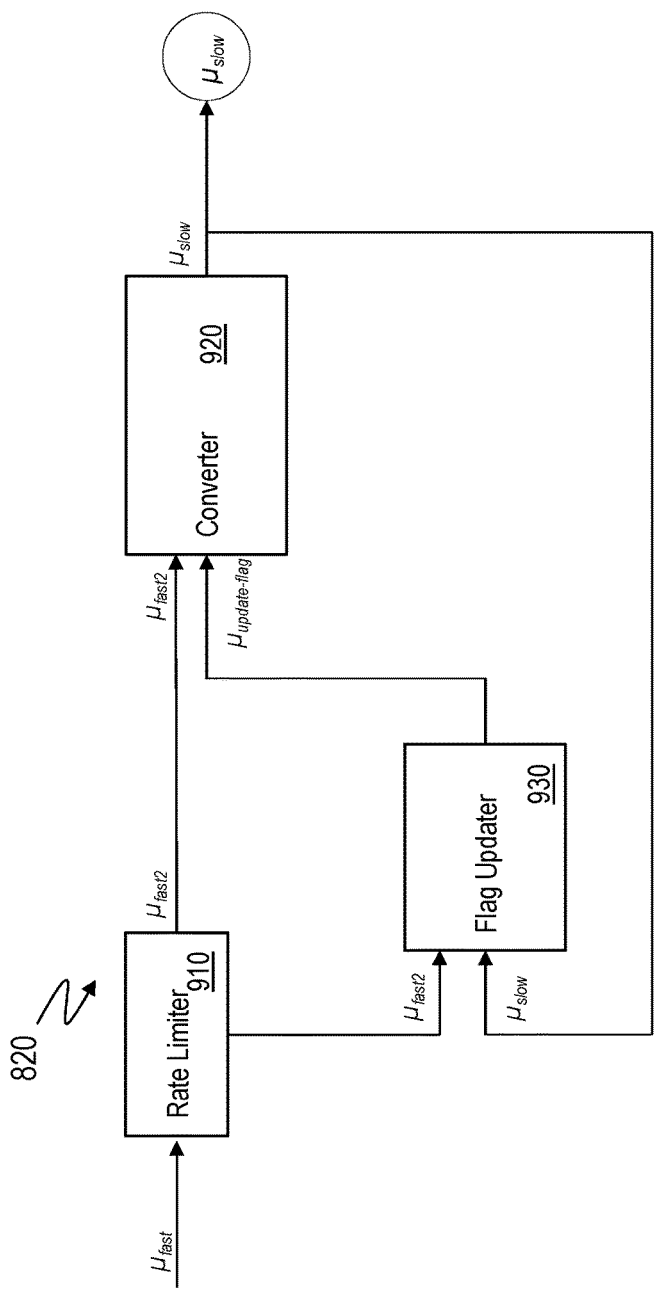
FIG. 9 illustrates a dataflow diagram that includes a friction-learning module in accordance with exemplary embodiments of the invention.

FIG. 9 illustrates example components and an example dataflow of the friction-learning module 820. In one or more examples, the friction-learning module 820 includes a rate limiter 910, a converter 920, and a flag updater 930, among other components. The friction-learning module 820 receives the $\mu_{fast}$ signal as input as described earlier. The rate limiter 910 receives the input $\mu_{fast}$ signal and outputs a second $\mu_{fast2}$ signal, at a different frequency than the input $\mu_{fast}$ signal. The converter 920 receives the $\mu_{fast2}$ signal as an input and generates the corresponding $\mu_{slow}$ signal. The converter 920 also receives a $\mu_{update\text{-}flag}$ as input from the flag updater 930.

Figure 10:
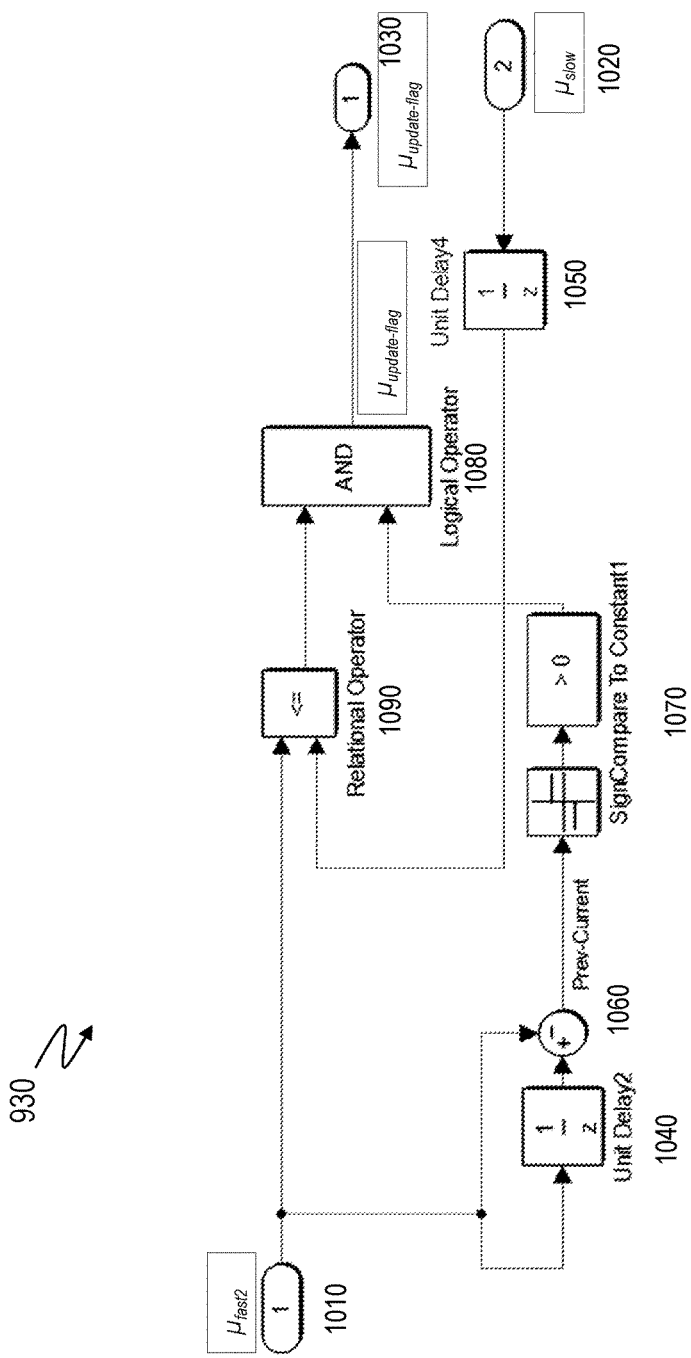
FIG. 10 illustrates a dataflow diagram that includes a flag updater module in accordance with exemplary embodiments of the invention.

The flag updater 930 sets the value of the $\mu_{update\text{-}flag}$ to TRUE (1) or FALSE (0) depending on the previous value of the $\mu_{slow}$ signal and the $\mu_{fast2}$ signal. FIG. 10 depicts example components and an example dataflow of the flag updater 930. It is understood that the flag updater of FIG. 9 is an example and that other implementations of the flag updater 930 are possible. The flag updater 930 depicted in FIG. 10 sets the value of the $\mu_{update\text{-}flag}$ to 1 if the value of the $\mu_{fast2}$ signal is ≤ the previous value of the $\mu_{slow}$ signal (i.e. output of 1050) and if the $\mu_{fast2}$ signal is decreasing. For example, as illustrated, the flag updater 930 receives, as input, the $\mu_{fast2}$ signal, and the $\mu_{slow}$ signal, and outputs the value of the $\mu_{update\text{-}flag}$, as shown at blocks 1010, 1020, and 1030.

The received $\mu_{fast2}$ signal passes through a unit delay to provide a previous value of the $\mu_{fast2}$ signal, as shown at block 1040. In concurrence, the received $\mu_{fast2}$ signal is passed through a subtractor to determine if the $\mu_{fast2}$ signal is decreasing, as shown at block 1060. Whether the $\mu_{fast2}$ signal is decreasing is determined by subtracting the current value of the $\mu_{fast2}$ signal from the previous value of the $\mu_{fast2}$ signal (delayed signal). The result of the subtractor is compared with a constant (0; zero) to determine the sign of the result (positive or negative), as shown at block 1070. If the output of the sign comparison is positive, that is the previous value is greater than the current value, the $\mu_{fast2}$ signal is decreasing (and vice versa). Accordingly, an output of the sign comparison is 1, that is TRUE, if the $\mu_{fast2}$ signal is decreasing and 0 (FALSE) otherwise. The output of the sign comparison is provided to a logical operator, such as an AND gate, as shown at block 1080. The logical operator in addition receives an input from a relational operator that compares the values of the $\mu_{fast2}$ signal and the previous value of the $\mu_{slow}$ signal, as shown at block 1080.

For example, the received $\mu_{slow}$ signal passes through a unit delay to provide a previous value of the $\mu_{slow}$ signal, as shown at block 1050. The relational operator receives both, the previous value of the $\mu_{slow}$ signal and the current value of the $\mu_{fast2}$ signal (that is the received $\mu_{fast2}$ signal), as shown at block 1090. The relational operator compares the two input values and outputs a 1 (TRUE) if the $\mu_{fast2}$ signal ≤ the $\mu_{slow}$ signal value, and 0 (FALSE) otherwise (or vice versa). The logical operator thus receives two inputs—an indication of whether the $\mu_{fast2}$ signal ≤ the previous value of the $\mu_{slow}$ signal value; and whether the $\mu_{fast2}$ signal is decreasing, as shown at block 1080. If both these conditions are true, the flag updater 930 sets the value of the $\mu_{update\text{-}flag}$ to 1 (TRUE), and to 0 (FALSE) otherwise (or vice versa).

Figure 11:
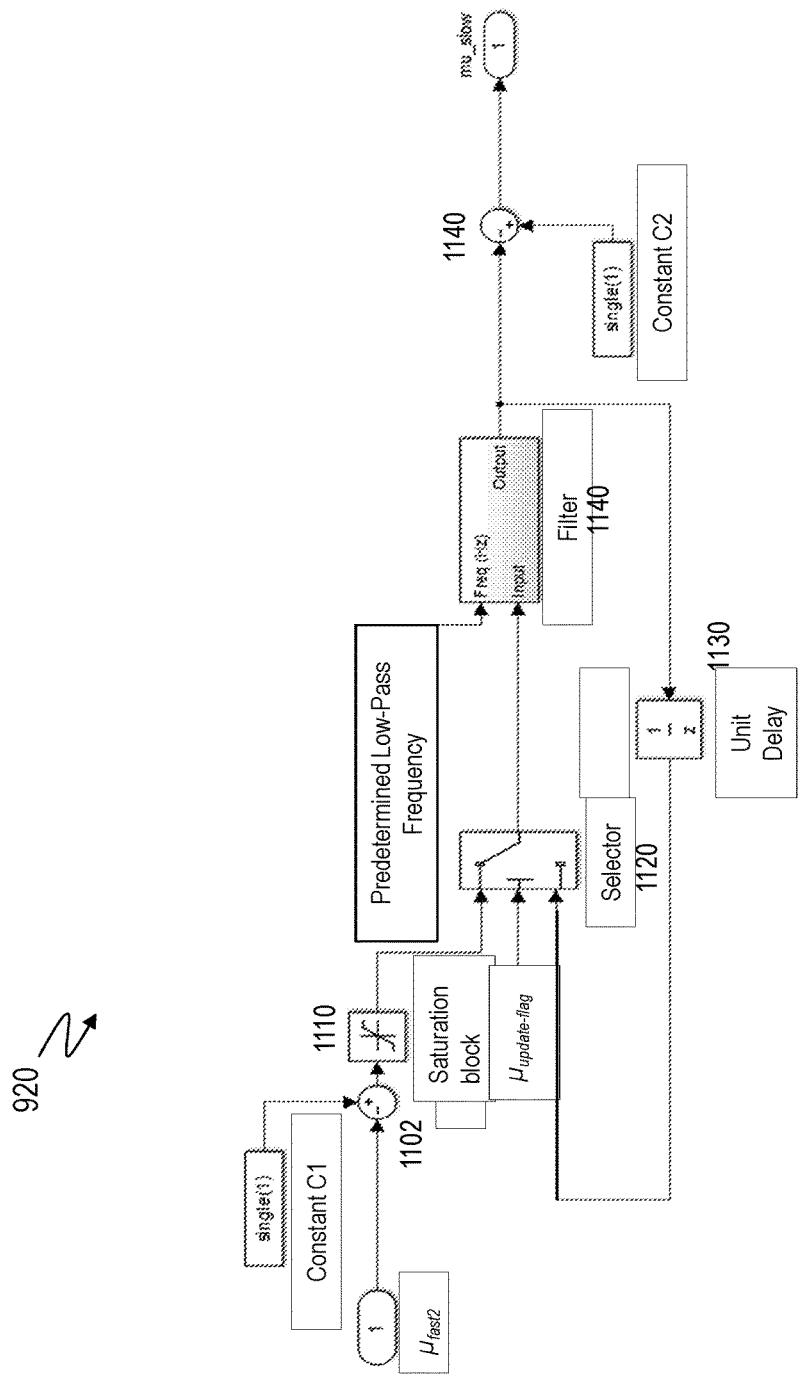
FIG. 11 illustrates a dataflow diagram that includes a converter module in accordance with exemplary embodiments of the invention.

Referring back to FIG. 9, the converter 920 converts the $\mu_{fast2}$ signal into the $\mu_{slow}$ signal based on the $\mu_{update\text{-}flag}$. For example, if value of the $\mu_{update\text{-}flag}$ is 0 (zero; false), the converter 920 does not perform the conversion and maintains the most recent output when value of the $\mu_{update\text{-}flag}$ was TRUE, and if the value of the $\mu_{update\text{-}flag}$ is 1 (true), the converter 920 performs the conversion (or vice versa). FIG. 11 illustrates example components and an example dataflow for conversion of the $\mu_{fast2}$ signal into the $\mu_{slow}$ signal by the converter 920. It is understood that the converter 920 depicted in FIG. 11 is exemplary and that other implementations may include other converters.

The example converter 920 FIG. 11 uses filter and decay to convert the $\mu_{fast2}$ signal into the $\mu_{slow}$ signal. The converter 920, upon receiving the $\mu_{fast2}$ signal, subtracts the $\mu_{fast2}$ signal from a constant C1, as shown at block 1102. The constant value may be, for example, a maximum threshold value of the $\mu_{fast2}$ signal, such as 1, or any other predetermined constant value. A saturation block of the converter 920 receives the output of the subtraction, as shown at block 1110. The saturation block limits the magnitude of the subtraction output based on a predetermined upper and a predetermined lower limit. For example, the saturation block compares the subtraction output with the upper and the lower limits. If the subtraction output is smaller than the lower limit, the saturation block outputs the lower limit. Similarly, if the subtraction output is greater than the upper limit, the saturation block outputs the upper limit. In other cases, the saturation block outputs the subtraction output.

The output from the saturation block passes to a selector, as shown at block 1120. The selector switches between the output from the saturation block and a delayed output based on the $\mu_{update\text{-}flag}$. The selector receives the $\mu_{update\text{-}flag}$ and the delayed output as other inputs, as shown at block 1120. The delayed output is received by passing the output of a filter module of the converter 920 through a unit delay, as shown at blocks 1130 and 1140. The filter module may be a low-pass filter that receives the output of the selector as one input and a predetermined low-pass frequency as a second input, as shown at block 1140. Alternatively or in addition, the low pass filter module generates the output according to:

$$y[n] = b1 \cdot u[n] + b2 \cdot u[n-1] - K \cdot a2 \cdot y[n-1] \quad \text{(Equation 19)}$$

where y is the output of the filter and u is an input to the filter, coefficients (b1, b2, and a2) are determined using predetermined low-pass frequency values for a simple first order low pass filter in some embodiments, K may be a value between 0.99 and 1.0. The parameters facilitate the filter module to output y to decay slowly to zero over time, when K is less than 1. When K=1, y (output) holds constant, assuming a constant input.

As described, the converter module 920, receives the $\mu_{update\text{-}flag}$ as input, based on which, the module output is either updated to a new $\mu_{slow}$ value, or maintained at the previous value itself (that is the output is not updated). Thus, the converter 920 processes the $\mu_{fast2}$ signal by a digital filter to generate a new $\mu_{slow}$ output value if the $\mu_{update\text{-}flag}$ is true, and the converter 920 maintains the output as is if the $\mu_{update\text{-}flag}$ is false. The functioning of the converter 920 may be described by the example digital filter equations below. In the equations, the input to the digital filter, u, is obtained by subtracting the $\mu_{fast2}$ signal from 1. Also, output of the filter, y is subtracted from 1 to get the output $\mu_{slow}$.

$$y[n] = b1 \cdot u[n] + b2 \cdot u[n-1] - K \cdot a2 \cdot y[n-1], \text{ if } \mu_{update\text{-}flag} = \text{true; and} \quad \text{(Equation 20)}$$

$$y[n] = y[n-1], \text{ if } \mu_{update\text{-}flag} = \text{false} \quad \text{(Equation 21)}$$

where y is the output of the filter and u is an input to the filter, n indicates current calculation step, coefficients (b1, b2, and a2) are predetermined parameter values based on predetermined low-pass frequency values for a simple first order low pass filter, and, K is a value less than or equal to 1.

Accordingly, the estimation module 302 of FIG. 7 modifies the Van der Jagt static model to predict a static torque generated by a tire by using a spring stiffness model to provide an additional torque. Additionally, the estimation module 302 of FIG. 7 estimates a friction factor 710 to compute the estimated steering rack force 212. The modified Van der Jagt model is represented by the equations 10-18.

Figure 12:
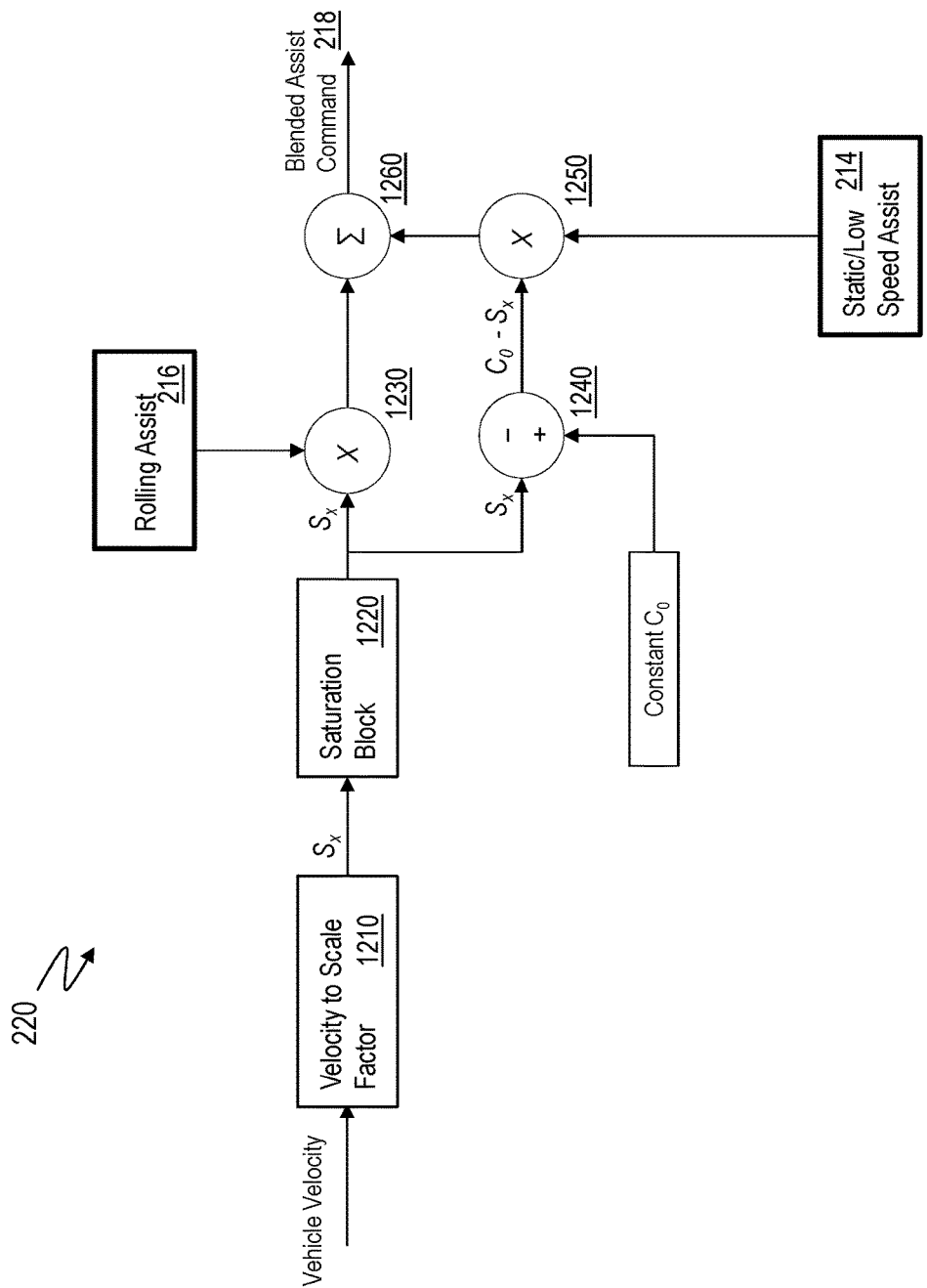
FIG. 12 illustrates a dataflow diagram that includes a blender module in accordance with exemplary embodiments of the invention.

FIG. 12 depicts an alternative example of the blender 220 that blends two or more assist torque commands. The assist torque command generator 204 generates the assist torque command 214 for static or low vehicle speed (0-20 kph) based on the estimation module 302, which operates according to the modified Van der Jagt model as described herein. The assist torque command generator 204 may also generate the assist torque command 216, which may be an assist torque command for the vehicle at a higher speed, such as >20 kph. Examples of generating such assist torque commands at higher speeds is described in U.S. patent application Ser. No. 14/263,162, filed Apr. 28, 2014, which is incorporated herein by reference in its entirety. The blender 220 blends the assist torque commands 214 and 216 and sends a blended command 218 to the motor.

In the example blender 220 of FIG. 12, the blending is based on the vehicle velocity. For example, the blender 220 receives the current vehicle velocity as an input, and determines a scaling factor $S_x$ based on the vehicle velocity, as shown at block 1210. For example, the blender 220 includes a one-dimensional lookup table that includes a mapping between multiple vehicle velocities and scaling factors. Alternatively, or in addition, the scaling factor may increase according to a predetermined linear relation of the vehicle velocity. In one or more examples, the scaling factor may increase until the vehicle velocity reaches a predetermined threshold, after which, the scaling factor may be a constant. In one or more examples, the blender 220 may include a saturation block that limits the scaling factor within a predetermined range, as shown at block 1220. For example, the predetermined range may be 0 to 1. In such a case, the scaling factor may be normalized to the predetermined range of the saturation block.

The blender 220 uses the scaling factor and the rolling assist 216 as inputs to a multiplier, as shown at block 1230. The multiplier outputs a product of the scaling factor and the rolling assist 218. The blender 220 adds a predetermined constant $C_0$ to negative of the scaling factor $S_x$ and uses the result $(-S_x+C_0)$ as a first input to a multiplier that also receives the static/low speed assist 214 as a second input, as shown at blocks 1240 and 1250. The blender 220 further sums the outputs from the two products of the rolling assist 216 and the static/low speed assist 214 to provide the blended assist command 218, as shown at block 1260. Thus, the EPS implementing the technical solutions described herein facilitate an improved manner of blending two or more torque assist commands that may be generated at different vehicle velocities depending on the velocities.

The technical solutions described herein facilitate learning a friction factor as applied to tire stiffness model when providing torque assist by an EPS system, particularly when the vehicle is at static or low vehicle speeds (0-20 kph). Based on the friction factor, the technical solutions described herein maintain a reduction in tire model forces when low friction factor is detected. Further, the technical solutions use the friction factor to limit the value of calculated tire windup (for example, low friction reduces maximum possible windup). By using the determining and using the friction factor as described, an EPS assist system, avoids low-frequency oscillation due to velocity feedback, and further avoids undesirable transitions between high-friction and low-friction assist values.

Additionally, the technical solutions described herein include a linear spring contribution in addition to the tire model when determining the estimated steering rack force. The linear spring contribution facilitates the EPS system to account for additional forces affecting the steering wheel due to suspension geometry of the vehicle. By accounting for the linear spring contributions, the EPS system can provide additional assist to support additional forces caused by suspension geometry, particularly when the vehicle is static or travelling at low speeds (0-20 kph).

Further yet, the technical solutions described herein facilitate the EPS system to blend multiple assists provided to the steering wheel depending on the vehicle speeds. For example, the technical solutions facilitate the EPS system, to blend a first assist command from tire model used at low speeds of the vehicle (0-20 kph) with a second assist command from a rolling bicycle model, which is used at higher speeds (>20 kph).

Further yet, the technical solutions described herein facilitate the EPS system to provide torque assistance on surfaces with low friction, such as ice, which may cause the vehicle to indicate a vehicle speed as static, that is 0 kph, even when the vehicle may be rolling, such as at 2-4 kph. For example, the technical solutions facilitate the EPS system to exclude assistance at lower speeds, such as <4 kph, depending on the vehicle sensor capability.

While the invention has been described in detail in connection with only a limited number of embodiments, it should be readily understood that the invention is not limited to such disclosed embodiments. Rather, the invention can be modified to incorporate any number of variations, alterations, substitutions, or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

What is claimed is:

1. A method of controlling an electric power steering system, the method comprising:
    determining a steering rack force to apply a torque to the electric power steering system, wherein determining the steering rack force comprises generating a friction factor based on a motor velocity of a motor of the electric power steering system, the friction factor indicative of a friction between a tire and a surface of a ground with which the tire is in contact;
    generating a steering assist torque command based on the steering rack force; and
    controlling the electric power steering system using the steering assist torque command.

2. The method of claim 1, wherein the steering rack force is generated in response to determining that one or more hand wheel torque sensors of the electric power steering system is not enabled.

3. The method of claim 1, wherein determining the steering rack force further comprises determining a component of the steering rack force caused by the tire and the surface of the ground with which the tire is in contact based on the motor velocity.

4. The method of claim 3, wherein determining the component of the steering rack force further comprises:
    filtering a motor angle with a low-pass filter, the motor angle being an angle of force experienced by the motor of the electric power steering system;
    filtering the motor velocity with a low-pass filter; and using the filtered motor angle and the filtered motor velocity to estimate the steering rack force.

5. The method of claim 3, wherein the component is a first component, and determining the steering rack force further comprises determining a second component of the steering rack force caused by linear spring stiffness.

6. The method of claim 1, wherein generating the friction factor comprises:
converting the motor velocity into a first friction factor value;
determining an upper limit for the friction factor based on the first friction factor value; and
scaling the first friction value to determine the friction factor value.

7. The method of claim 6, wherein the upper limit for the friction factor is determined in response to a value of the first friction factor being lesser than immediately preceding value of the motor velocity.

8. The method of claim 7, wherein the upper limit for the friction factor is determined in response to the first friction value being less than or equal to a delayed value of the upper limit for the friction factor.

9. A power steering system comprising:
a steering assist unit; and
a control module coupled with the steering assist unit, the control module configured to:
determine a steering rack force to apply a torque to a steering wheel, wherein determination of the steering rack force comprises generation of a friction factor based on a motor velocity of a motor of the steering assist unit, the friction factor indicative of a friction between a tire and a surface of a ground with which the tire is in contact;
generate a steering assist torque command based on the steering rack force; and
control the power steering system using the steering assist torque command.

10. The power steering system of claim 9, wherein the steering rack force is generated in response to determining that one or more hand wheel torque sensors is not enabled.

11. The power steering system of claim 9, wherein the steering assist torque command is a first steering assist torque command, and the control module is further configured to:
generate a second steering assist torque command;
generate a third steering assist torque command by combining the first steering assist torque command and the second steering assist torque command; and
control the power steering system using the third steering assist torque command.

12. The power steering system of claim 9, wherein determination of the steering rack force further comprises determination of a component of the steering rack force caused by the tire and the surface of the ground with which the tire is in contact based on the motor velocity.

13. The power steering system of claim 12, wherein the component is a first component, and determination of the steering rack force further comprises determination of a second component of the steering rack force caused by linear spring stiffness.

14. The power steering system of claim 12, wherein generation of the friction factor comprises determination of an upper limit for the friction factor based on a first friction factor value in response to a value of the motor velocity being lesser than immediately preceding value of the motor velocity.

* * * * *